(12) United States Patent
Sun et al.

(10) Patent No.: US 10,576,679 B2
(45) Date of Patent: Mar. 3, 2020

(54) MULTI-LAYER TUBE AND PROCESS OF MAKING THE SAME

(71) Applicant: Berry Plastics Corporation, Evansville, IN (US)

(72) Inventors: David Dezhou Sun, Evansville, IN (US); Philip A. Driskill, Newburgh, IN (US); Jeffrey C. Minnette, Evansville, IN (US); Birju A. Surti, Ronks, PA (US); Jonathan K. Williams, Lancaster, PA (US)

(73) Assignee: Berry Plastics Corporation, Evansville, IN (US)

( * ) Notice: Subject to any disclaimer, the term of this patent is extended or adjusted under 35 U.S.C. 154(b) by 232 days.

(21) Appl. No.: 15/832,828

(22) Filed: Dec. 6, 2017

(65) Prior Publication Data

US 2018/0093408 A1    Apr. 5, 2018

Related U.S. Application Data

(63) Continuation of application No. 14/475,411, filed on Sep. 2, 2014, now Pat. No. 9,889,594.
(Continued)

(51) Int. Cl.
*B29C 49/22* (2006.01)
*B29C 49/04* (2006.01)
(Continued)

(52) U.S. Cl.
CPC .............. *B29C 49/22* (2013.01); *B29B 11/10* (2013.01); *B29C 48/0017* (2019.02); *B29C 48/09* (2019.02); *B29C 48/21* (2019.02); *B29C 48/49* (2019.02); *B29C 49/0005* (2013.01); *B29C 49/04* (2013.01); *B29C 49/46* (2013.01); *B29B 2911/14166* (2013.01); *B29C 49/4252* (2013.01); *B29C 49/4817* (2013.01);
(Continued)

(58) Field of Classification Search
CPC ...................................................... B29C 49/22
See application file for complete search history.

(56) References Cited

U.S. PATENT DOCUMENTS 7,183,005 B2   2/2007  Poloso
9,937,652 B2   4/2018  Sun
(Continued)

FOREIGN PATENT DOCUMENTS

CN    102892678 A    1/2013
EP      0329490 A2    8/1989
(Continued)

OTHER PUBLICATIONS

Office Action dated Sep. 7, 2018 for U.S. Appl. No. 15/239,894, (pp. 1-9).
(Continued)

*Primary Examiner* — Larry W Thrower
(74) *Attorney, Agent, or Firm* — Barnes & Thornburg LLP

(57) ABSTRACT

A vessel is configured to hold a product in an interior region formed in the vessel. The vessel includes an inner layer arranged to define the interior region and an outer layer. The vessel is formed using a blow-molding process in which a multiple layer parison is blow molded to form the vessel. The multiple layer parison is formed in an extrusion process in which a number of extruders are arranged to co-extrude associated inner and outer parisons to establish the multiple layer parison.

20 Claims, 4 Drawing Sheets

Related U.S. Application Data

Figure 1:
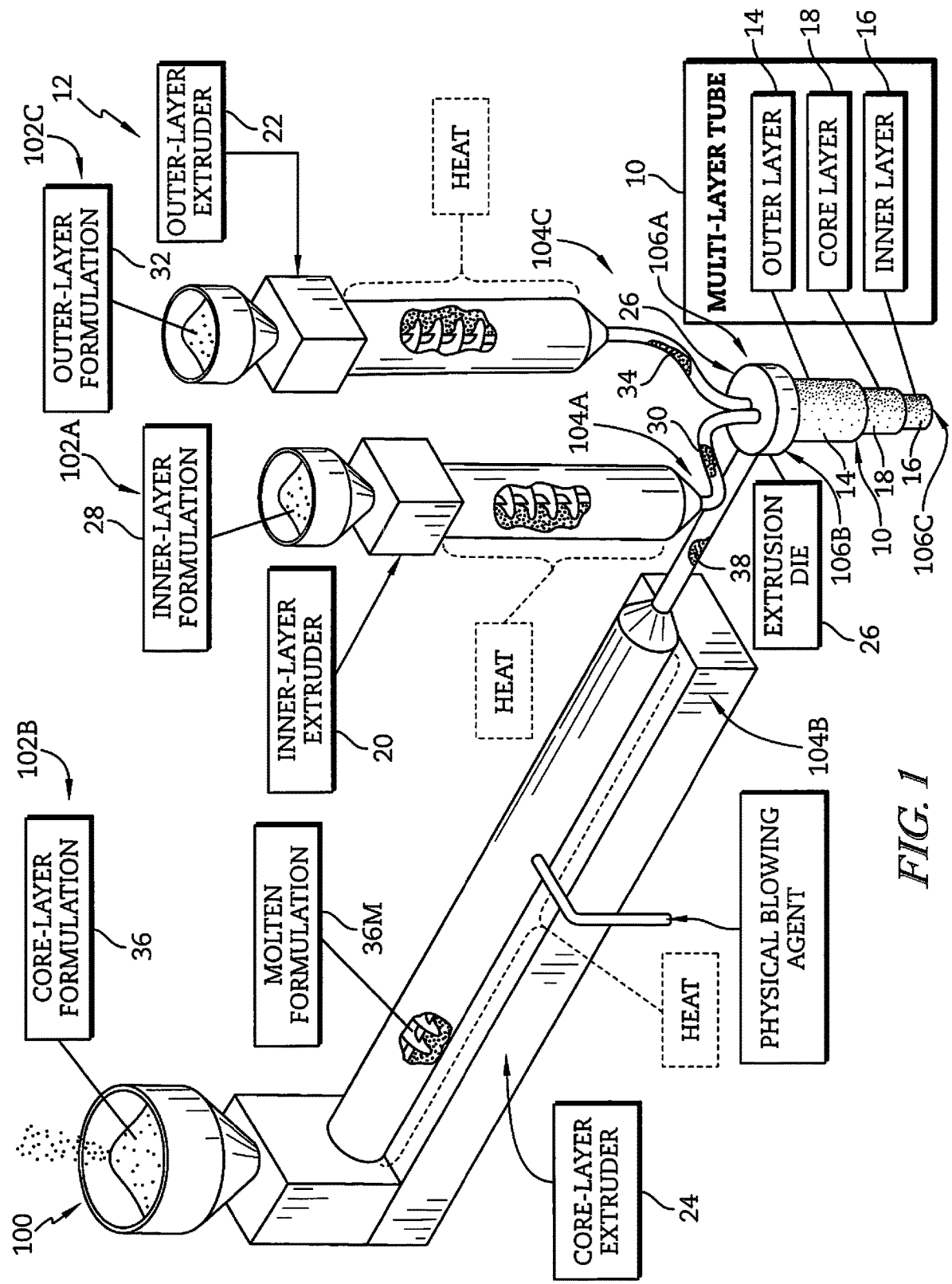

(60) Provisional application No. 61/872,183, filed on Aug. 30, 2013, provisional application No. 61/872,368, filed on Aug. 30, 2013, provisional application No. 61/872,260, filed on Aug. 30, 2013.

(51) Int. Cl.

| | |
|---|---|
| *B29C 49/00* | (2006.01) |
| *B29C 48/09* | (2019.01) |
| *B29C 48/00* | (2019.01) |
| *B29C 48/21* | (2019.01) |
| *B29C 48/49* | (2019.01) |
| *B29C 49/46* | (2006.01) |
| *B29B 11/10* | (2006.01) |
| *B29K 23/00* | (2006.01) |
| *B29L 31/00* | (2006.01) |
| *B29K 105/04* | (2006.01) |
| *B29C 49/48* | (2006.01) |
| *B29C 49/62* | (2006.01) |
| *B29C 49/42* | (2006.01) |

(52) U.S. Cl.
CPC ............... *B29C 2049/4608* (2013.01); *B29C 2049/627* (2013.01); *B29C 2791/006* (2013.01); *B29C 2791/007* (2013.01); *B29K 2023/065* (2013.01); *B29K 2105/04* (2013.01); *B29K 2995/0063* (2013.01); *B29L 2031/712* (2013.01)

(56) References Cited

U.S. PATENT DOCUMENTS

| | | | |
|---|---|---|---|
| 2003/0211350 | A1 | 11/2003 | Migliorini |
| 2006/0100296 | A1 | 5/2006 | Wilkes |
| 2010/0279046 | A1 | 11/2010 | Ashman |
| 2013/0052385 | A1 | 2/2013 | Leser |
| 2014/0228498 | A1 | 8/2014 | Prince |
| 2014/0272229 | A1 | 9/2014 | Xing |
| 2014/0309320 | A1 | 10/2014 | Prince |
| 2014/0377512 | A1 | 12/2014 | Rogers |
| 2015/0284521 | A1 | 10/2015 | Abubakar |
| 2015/0307679 | A1 | 10/2015 | Lee |
| 2016/0257052 | A1 | 9/2016 | Sun |

FOREIGN PATENT DOCUMENTS

| | | |
|---|---|---|
| EP | 1072389 A1 | 1/2001 |
| EP | 1449634 A1 | 8/2004 |
| JP | 4278340 A | 10/1992 |
| WO | 2012174567 A1 | 12/2012 |

OTHER PUBLICATIONS

Chinese Office Action for Chinese App. No. 20180039581.8 dated May 31, 2019, 7 pages.
Unilever Says It Will Use Less Plastic Per Bottle, Yahoo News (Apr. 22, 2014, 10:20 AM), http://news.yahoo.com/unilever-says-less-plastic-per-bottle-142039401-finance.html (3 pages).
Chinese Office Action for Application Serial No. 201480021009.9, dated Aug. 7, 2017 including English language summary, 12 pages.
Chinese Office Action for Chinese App. No. 201480047976.2 dated Aug. 22, 2017, 15 pages.
Dongwu Yang, Plastic Material Selection Technology, Light Industry Press, Jan. 2008, 1 page.
Australian First Patent Examination Report for Australian App. No. 2014311991 dated Oct. 4, 2017, 4 pages.
Office Action dated Oct. 3, 2017 for U.S. Appl. No. 15/491,443; (pp. 1-6).
Office Action dated Oct. 6, 2017 for U.S. Appl. No. 15/383,115; (pp. 1-5).
Office Action dated Oct. 27, 2017 for U.S. Appl. No. 15/239,894; (pp. 1-7).
Chinese Office Action for Application Serial No. 201480021009.9, dated Jan. 2, 2018 including English language summary, 6 pages.
Office Action dated Jan. 17, 2018 for U.S. Appl. No. 15/591,355; (pp. 1-5).
Chinese Office Action for Chinese App. No. 20180042446.9 dated Feb. 3, 2018, 9 pages.
Chinese Office Action for Chinese App. No. 20180039581.8 dated Feb. 23, 2018, 13 pages.
Chinese Office Action for Chinese App. No. 201480047978.1 dated Feb. 24, 2018, 11 pages.
Chinese Final Rejection for Chinese App. No. 201480047976.2 dated Mar. 7, 2018, 8 pages.
Vasile et al., Practical Guide to Polyethylene, published by Smithers Rapra Press, 2008, p. 119, 3 pages.
Office Action dated Jul. 15, 2019 for U.S. Appl. No. 15/902,489, (pp. 1-24).
Chinese Reexamination Notification for Chinese App. No. 201480047976.2 dated Jul. 15, 2019, 12 pages.
Office Action dated Jul. 26, 2019 for U.S. Appl. No. 16/149,351, (pp. 1-6).
Chinese Office Action for Application Serial No. 201480021009.9, dated Apr. 20, 2018 including English language summary, 6 pages.
Chinese Office Action for Chinese App. No. 201480047578.0 dated Jan. 24, 2018, 10 pages.
Office Action dated Apr. 16, 2018 for U.S. Appl. No. 15/061,070, (pp. 1-13).
Definition of "Base," Dictionary.com, available at http://www.dictionary.com/browse/base, retrieved on Apr. 16, 2018.
Office Action dated Apr. 20, 2018 for U.S. Appl. No. 15/239,894, (pp. 1-13).
Office Action dated Apr. 27, 2018 for U.S. Appl. No. 15/061,005 (pp. 1-7).
Chinese Office Action for Chinese App. No. 201480047578.0 dated Aug. 29, 2018, 4 pages.
Chinese Office Action for Chinese App. No. 20180042446.9 dated Oct. 31, 2018, 5 pages.
Office Action dated Jun. 15, 2018 for U.S. Appl. No. 15/491,443, pp. 1-6.
First Examination Report for Indiana Patent App. No. 9302/DELNP/2015 dated May 6, 2019, 7 pages.
Office Action dated Mar. 8, 2019 for U.S. Appl. No. 15/902,489, (pp. 1-16).
First Substantive Examination Report for European App. No. 14768125.8 dated Mar. 21, 2019, 6 pages.
Lubrizol Advanced Materials, Inc., Extrusion Guide, 2014, 16 pages.
Chinese Office Action for Chinese App. No. 20180039581.8 dated Jan. 14, 2019, 10 pages.
Office Action dated Oct. 4, 2019 for U.S2 Appl. No. 15/713,799, (pp. 1-5).

US 10,576,679 B2

MULTI-LAYER TUBE AND PROCESS OF MAKING THE SAME

PRIORITY CLAIM

This application is a continuation of U.S. patent application Ser. No. 14/475,411, filed Sep. 2, 2014, which claims priority under 35 U.S.C. § 119(e) to U.S. Provisional Application Ser. No. 61/872,260, filed Aug. 30, 2013, U.S. Provisional Application Ser. No. 61/872,368, filed Aug. 30, 2013, and U.S. Provisional Application Ser. No. 61/872,183, filed Aug. 30, 2013, each of which is expressly incorporated by reference herein.

BACKGROUND

The present disclosure relates to extruded materials, and in particular to extruded materials made from polymeric materials. More particularly, the present disclosure relates to a process for making extruded materials.

SUMMARY

A vessel in accordance with the present disclosure is configured to hold a product in an interior region. In illustrative embodiments, the vessel is an insulated container such as a drink cup. In illustrative embodiments, the vessel is a container such as a shampoo bottle.

In illustrative embodiments, a container is formed from a multiple layer tube in a multiple layer co-extrusion blow molding process. The multiple layer tube includes an inner polymeric layer, an outer polymeric spaced apart from the inner polymeric material, and a middle cellular non-aromatic polymeric material located between the inner and outer polymeric layers.

In illustrative embodiments, the middle cellular non-aromatic polymeric layer has a density in a range of about 0.01 g/cm$^3$ to about 0.8 g/cm$^3$. In illustrative embodiments, the middle cellular non-aromatic polymeric layer has a density in a range of about 0.3 g/cm$^3$ to about 0.5 g/cm$^3$. In illustrative embodiments, the middle cellular non-aromatic polymeric layer has a density in a range of about 0.3 g/cm$^3$ to about 0.35 g/cm$^3$.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
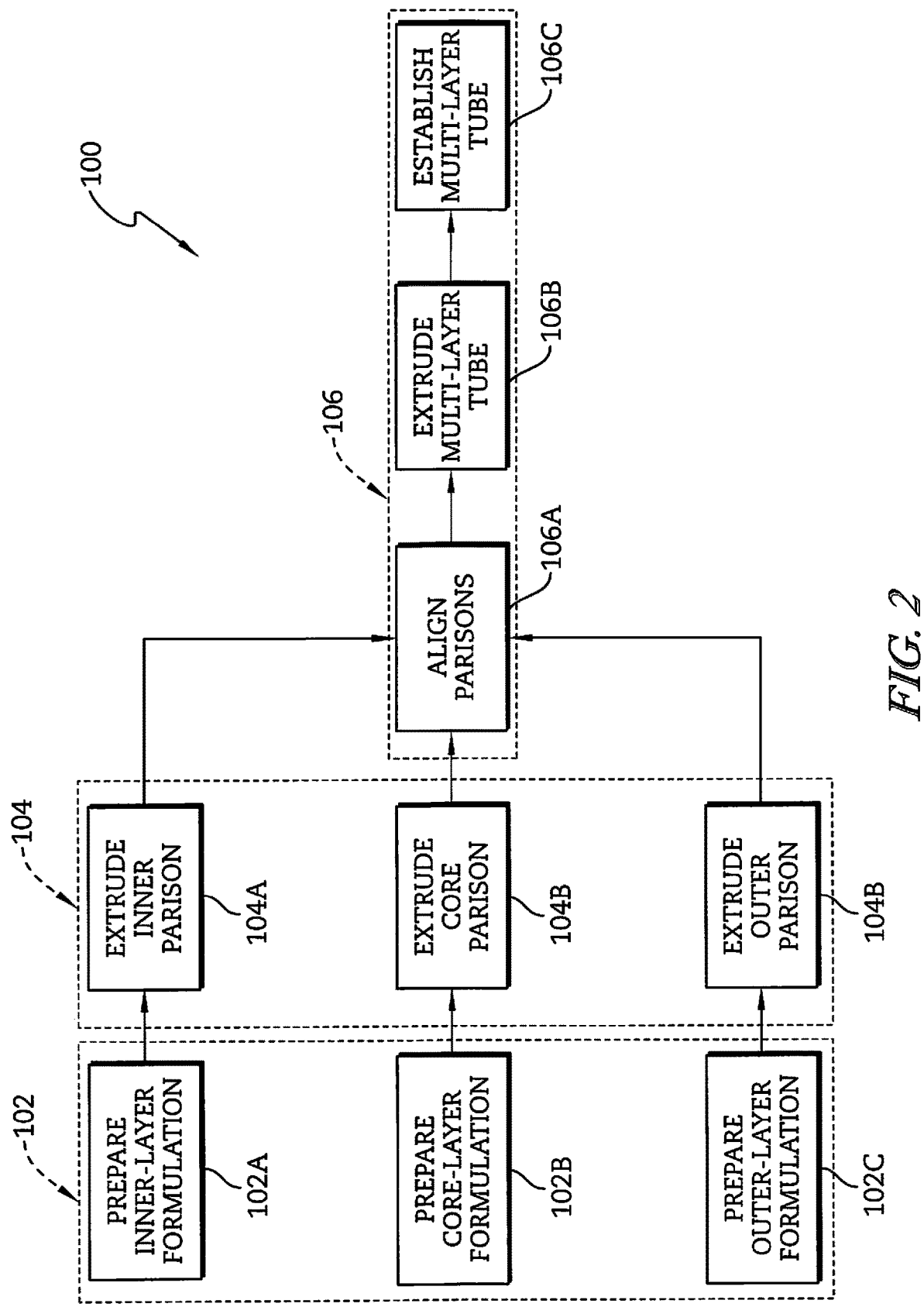
Figure 4:
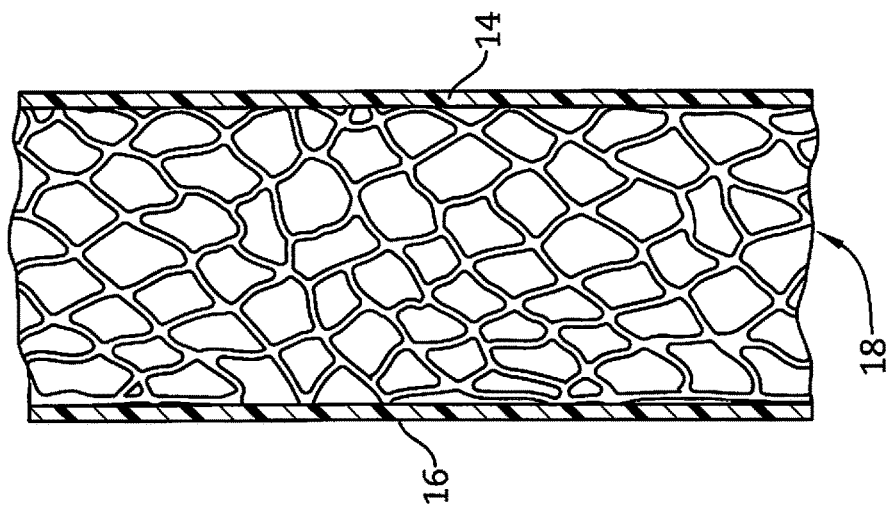
Figure 3:
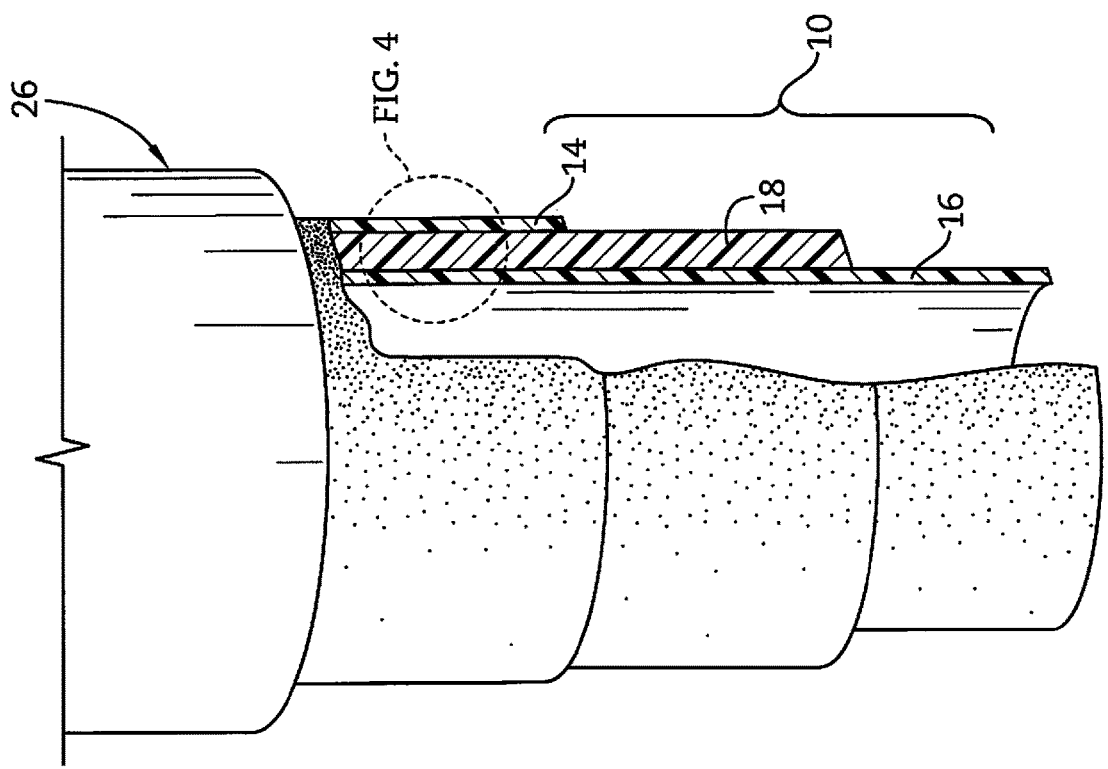
Figure 5:
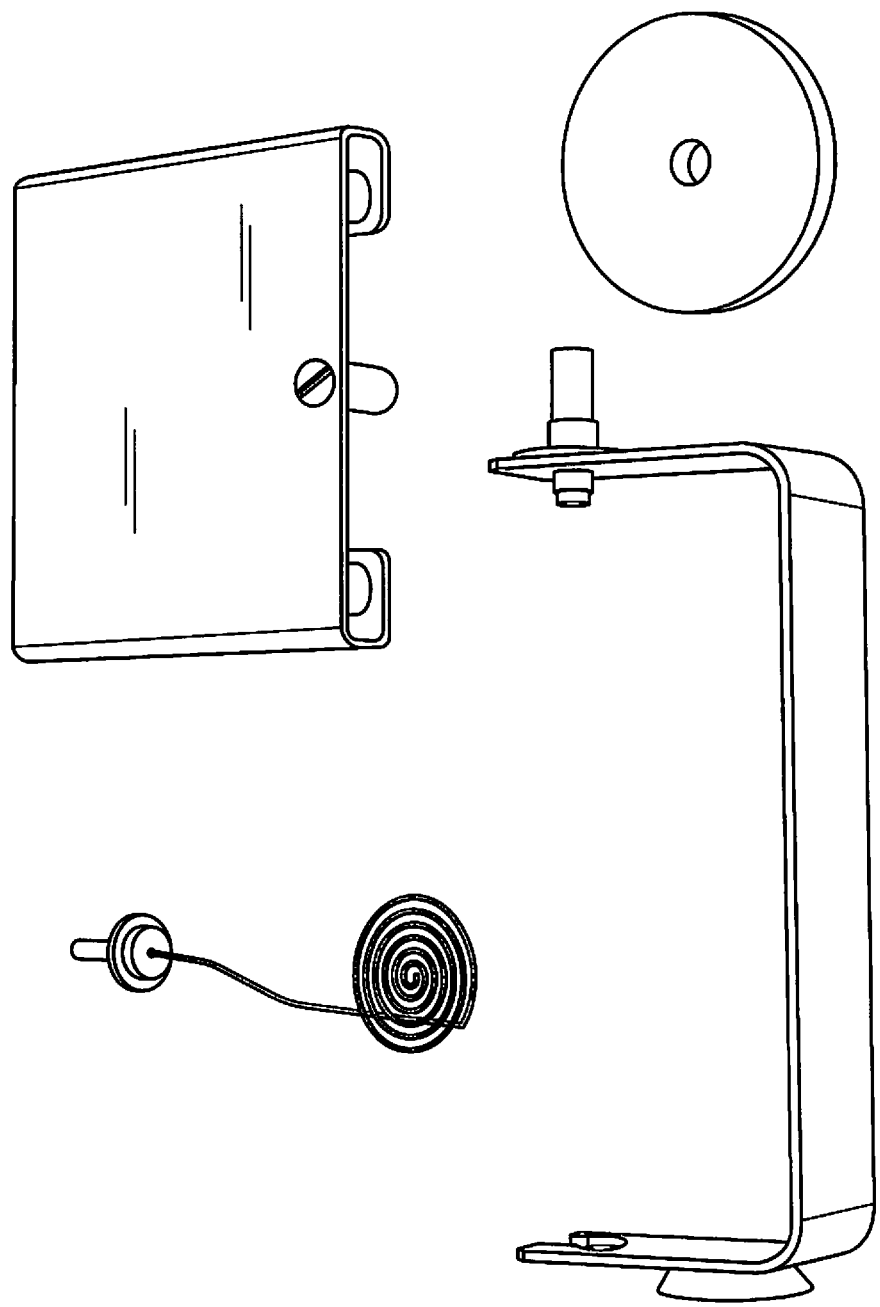

The detailed description particularly refers to the accompanying figures in which:

FIG. 1 is a perspective and diagrammatic view of a co-extrusion system in accordance with the present disclosure used to make a multiple layer tube in accordance with the present disclosure showing that the co-extrusion system includes an outer-layer extruder configured to receive an outer-layer formulation and provide an outer-layer parison, an inner-layer extruder configured to receive an inner-layer formulation and provide an inner-layer parison, a core-layer extruder configured to receive a core-layer formulation and provide a core-layer parison, and a co-extrusion die coupled to each of the extruders to receive the associated parisons and to extrude the inner-layer, core-layer, and outer-layer parisons to establish the multiple layer tube;

FIG. 2 is a diagrammatic view of the co-extrusion process in accordance with the present disclosure showing that the co-extrusion process includes the operations of preparing the inner-layer formulation, extruding the inner-layer parison, preparing the core-layer formulation, extruding the core-layer parison, preparing the outer-layer formulation, extruding the outer-layer parison, aligning the inner-layer, core-layer, and outer-layer parisons, extruding the multiple layer tube, and establishing the multiple layer tube;

FIG. 3 is an enlarged partial-perspective view of the of the extrusion die and multiple layer tube of FIG. 1 with portions of the multiple layer tube broken away to reveal that the multiple layer tube includes, from inside to outside, the inner layer, the core layer, and the outer layer;

FIG. 4 is an enlarged view taken from the circled region of FIG. 3 showing that the inner layer is made from a relatively high-density polymeric material, the core layer is made from a relatively low-density insulative cellular non-aromatic polymeric material, and that the outer layer is made from a relatively high-density polymeric material; and FIG. 5 is a perspective view of an unassembled density determination apparatus showing the components (clockwise starting in the upper left) gem holder, platform, suspension bracket, and suspension spacer.

DETAILED DESCRIPTION

A multiple layer tube 10 in accordance with the present disclosure is formed by a co-extrusion process 100 as shown in FIG. 2 using a co-extrusion system 12 as shown in FIG. 1. Multiple layer tube 10 includes an outer layer 14, an inner layer 16 spaced apart from outer layer 14, and a core layer 18 located therebetween. Outer layer 14 and inner layer 16 are made from relatively high-density polymeric materials while core layer 18 is made from a relatively low-density insulative cellular non-aromatic polymeric material as suggested in FIG. 4. Core layer 18 is configured to provide means for minimizing a density of multiple layer tube 10 so that an amount of material used during co-extrusion process 100 is minimized. In one illustrative example, multiple layer tube 10 may be used to form a multiple layer container.

Multiple layer tube 10 is formed by co-extrusion process 100 as shown illustratively in FIG. 1 and diagrammatically in FIG. 2. Co-extrusion process 100 includes a preparing stage 102 in which various material formulations are provided to co-extrusion system 12, an extrusion stage 104 in which the various material formulations are processed by co-extrusion system 12 to provide associated parisons, and a co-extrusion stage 106 in which the various parisons are extruded to provide multiple layer tube 10 as shown in FIG. 1 and suggested in FIG. 2.

Co-extrusion process 100 is performed on co-extrusion system 12 as shown in FIG. 1. Co-extrusion system 12 includes an inner-layer extruder 20, an outer-layer extruder 22, a core-layer extruder 24, and an co-extrusion die 26 as shown in FIG. 1. Inner-layer extruder 20 receives an inner-layer formulation 28 of a relatively high-density polymeric material and processes inner-layer formulation 28 to provide an inner-layer parison 30 to co-extrusion die 26 as suggested in FIG. 1 and shown in FIG. 2. Outer-layer extruder 22 receives an outer-layer formulation 32 of a relatively high-density polymeric material and processes outer-layer formulation 32 to provide an outer-layer parison 34 to co-extrusion die 26 as suggested in FIG. 1 and shown in FIG. 2. Core-layer extruder 24 receives a core-layer formulation 36 of a relatively low-density insulative cellular non-aromatic polymeric material and processes core-layer formulation 36 to provide a core-layer parison 38 to co-extrusion die 26 as suggested in FIG. 1 and shown in FIG. 2. Co-extrusion die 26 receives the various parisons 30, 34, 38 and extrudes multiple layer tube 10 as shown in FIG. 1.

Co-extrusion process 100 begins with preparing stage 102. Preparing stage 102 includes a preparing operation 102A in which inner-layer formulation 28 is prepared and provided to inner-layer extruder 20 as shown in FIG. 1 and suggested in FIG. 2. Preparing stage 102 also includes another preparing operation 102B in which core-layer formulation 36 is prepared and provided to core-layer extruder 24. Preparing stage 102 further includes another preparing operation 102C in which outer-layer formulation 32 is prepared and provided to outer-layer extruder 22. While three formulations are discussed herein, more or less formulations may be fed to associated extruders to produce a multiple layer tube having more or less layers.

Extrusion stage 104 of co-extrusion process 100 begins after preparing stage 102 is complete as suggested in FIG. 2. Extrusion stage 104 begins with an extruding operation 104A in which inner-layer extruder 20 processes inner-layer formulation 28 to provide inner-layer parison 30 as suggested in FIG. 2. Extrusion stage 104 further includes another extruding operation 104B in which core-layer extruder 24 processes core-layer formulation 36 to provide core-layer parison 38 as suggested in FIG. 2. Extrusion stage 104 further includes yet another extruding operation 104C in which outer-layer extruder 22 processes outer-layer formulation 32 to provide outer-layer parison 34. While three extruders are discussed herein, more or less extruders may be used to produce associated parisons for use in establishing a multiple layer tube having more or less layers.

Co-extrusion stage 106 of co-extrusion process 100 begins after extrusion stage 104 is complete as shown in FIG. 2. Co-extrusion stage 106 begins with an aligning operation 106A in which the inner-layer, outer-layer, and core-layer parisons 30, 34, 38 are fed from associated extruders 20, 22, 24 to co-extrusion die 26 and aligned by upper tooling included in co-extrusion die 26 so that core-layer parison 38 is located between inner-layer and outer-layer parisons 30, 34 as shown in FIG. 1. Co-extrusion stage 106 then proceeds to an extruding operation 106B in which all three parisons 30, 34, 38 are co-extruded at the same time through lower tooling included in co-extrusion die 26 to begin forming multiple layer tube 10 as suggested in FIG. 1 and shown in FIG. 3. Co-extrusion stage 106 then proceeds to an establishing operation 106C when a sufficient length of multiple layer tube 10 has been established. Once establishing operation 106C is complete, multiple layer tube 10 is ready for a subsequent operation such as a blow-molding process in which a multiple layer container may be established or a slitting process in which a multiple layer sheet may be established. Reference is hereby made to U.S. Provisional Application Ser. No. 61/872,183, filed Aug. 30, 2013 and titled CONTAINER AND PROCESS FOR MAKING THE SAME and U.S. application Ser. No. 14/475,266, filed Sep. 2, 2014 and titled CONTAINER AND PROCESS FOR MAKING THE SAME for disclosure relating a process for forming a multiple layer container using a multiple layer tube, which applications are hereby incorporated by reference in their entirety herein.

During preparing operation 102A of preparing stage 102, inner-layer formulation 28 is prepared and provided to inner-layer extruder 20 as shown in FIG. 1. In one example, inner-layer formulation 28 comprises at least one polymeric material. The polymeric material may include one or more resins. In one example, inner-layer formulation 28 includes a relatively high-density polymeric material. In yet another example, inner-layer formulation 28 is FORMOLENE® HB5502F HDPE hexene copolymer (available from Formosa Plastics Corporation).

In another example, inner-layer formulation 28 comprises a relatively high-density polymeric material and a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

Various inner-layer formulations 28 were ran through inner-layer extruder 20 for various trial runs. Table 1 below shows operating parameters for inner-layer extruder 20 for each trial run. Each screw used in inner-layer extruder 20, may be defined using a diameter and an L/D ratio where "L" is the length of the screw and "D" is the diameter of the screw.

TABLE 1

Inner-Layer Extruder Operating Parameters

| Trial Run Number | Extruder Screw Size (mm) | L/D Ratio | Melt Pressure (PSI) | Melt Temp (° F.) | Screw RPM | Screw Torque (ft*lbs) | Temp Zone 1 (° F.) | Temp Zone 2 (° F.) | Temp Zone 3 (° F.) |
|---|---|---|---|---|---|---|---|---|---|
| 1 | 30 | 25:1 | 2950 | 363 | 18 | 28 | 350 | 360 | 370 |
| 2 | 30 | 25:1 | 2960 | 363 | 18 | 31 | 350 | 360 | 370 |
| 3 | 30 | 25:1 | 2970 | 363 | 18 | 29 | 350 | 360 | 370 |
| 4 | 30 | 25:1 | 2930 | 363 | 18 | 28 | 350 | 360 | 370 |
| 5 | 30 | 25:1 | 3080 | 364 | 30 | 30 | 350 | 360 | 370 |
| 6 | 30 | 25:1 | 3080 | 364 | 18 | 30 | 350 | 360 | 370 |
| 7 | 30 | 25:1 | 3090 | 364 | 18 | 30 | 350 | 360 | 370 |
| 8 | 30 | 25:1 | 3150 | 364 | 18 | 33 | 350 | 360 | 370 |
| 9 | 30 | 25:1 | 3170 | 364 | 18 | 31 | 350 | 360 | 370 |
| 10 | * | * | * | * | * | * | * | * | * |
| 11 | 30 | 25:1 | 3310 | 363 | 18 | 33 | 350 | 360 | 370 |
| 12 | 30 | 25:1 | 3380 | 364 | 18 | 34 | 350 | 360 | 370 |
| 13 | 30 | 25:1 | 3370 | 364 | 18 | 32 | 350 | 360 | 370 |
| 14 | 30 | 25:1 | 3240 | 364 | 18 | 32 | 350 | 360 | 370 |
| 15 | 30 | 25:1 | 3250 | 364 | 18 | 31 | 350 | 360 | 370 |
| 16 | 30 | 25:1 | 3500 | 364 | 22 | 35 | 350 | 360 | 370 |
| 17 | 30 | 25:1 | 3430 | 366 | 22 | 34 | 350 | 360 | 370 |
| 18 | 30 | 25:1 | 3430 | 366 | 22 | 34 | 350 | 360 | 370 |
| 19 | 30 | 25:1 | 3480 | 366 | 26 | 34 | 350 | 360 | 370 |

TABLE 1-continued

| | Inner-Layer Extruder Operating Parameters | | | | | | | | |
|---|---|---|---|---|---|---|---|---|---|
| Trial Run Number | Extruder Screw Size (mm) | L/D Ratio | Melt Pressure (PSI) | Melt Temp (° F.) | Screw RPM | Screw Torque (ft*lbs) | Temp Zone 1 (° F.) | Temp Zone 2 (° F.) | Temp Zone 3 (° F.) |
| 20 | 30 | 25:1 | 4150 | 325 | 35 | 40 | 320 | 322 | 325 |
| 21 | 30 | 25:1 | 4150 | 325 | 35 | 38 | 320 | 322 | 325 |

* No data available for this trial run

During preparing operation 102C of preparing stage 102, outer-layer formulation 32 is prepared and provided to outer-layer extruder 22 as shown in FIG. 1. In one example, outer-layer formulation 32 comprises at least one polymeric material. The polymeric material may include one or more resins. In another example, outer-layer formulation 32 comprises relatively high-density polymeric material. In yet another example, inner-layer formulation 28 is FORMOLENE® HB5502F HDPE hexene copolymer (available from Formosa Plastics Corporation).

In another example, outer-layer formulation 32 comprises a relatively high-density polymeric material and a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

Various outer-layer formulations 32 were ran through outer-layer extruder 22 for various trial runs. Table 2 below shows operating parameters for outer-layer extruder 22 for each trial run. Each screw used in outer-layer extruder 22, may be defined using a diameter and an L/D ratio where "L" is the length of the screw and "D" is the diameter of the screw.

In some examples, inner-layer formulation 28 and outer-layer formulation 32 may be the same. In other examples, inner-layer formulation 28 and outer-layer formulation 32 may be different.

During preparing operation 102B of preparing stage 102, core-layer formulation 36 is prepared and provided to core-layer extruder 24 as shown in FIG. 1. Core-layer formulation 36 is an insulative cellular non-aromatic polymeric material. In one example, core-layer formulation 36 comprises a polyethylene base resin and one or more cell-forming agents. Core-layer formulation 36 uses a polyethylene-based formulation to produce insulative cellular non-aromatic polymeric material after being processed through core-layer extruder 24. Core-layer formulation 36 is heated in core-layer extruder 24 where a cell-forming agent is introduced into the molten core-layer formulation 36M prior to moving the materials from core-layer extruder 24 to co-extrusion die 26. As molten core-layer formulation 36M exits co-extrusion die 26 between inner and outer layers 16, 14, cells nucleate in the molten material and the material expands to form core layer 18 made from insulative cellular non-aromatic polymeric material.

In one exemplary embodiment, core-layer formulation 36 used to produce the insulative cellular non-aromatic poly-

TABLE 2

| | Outer-Layer Extruder Operating Parameters | | | | | | | | |
|---|---|---|---|---|---|---|---|---|---|
| Trial Run Number | Extruder Screw Size (mm) | L/D Ratio | Melt Pressure (PSI) | Melt Temp (° F.) | Screw RPM | Screw Torque (ft*lbs) | Temp Zone 1 (° F.) | Temp Zone 2 (° F.) | Temp Zone 3 (° F.) |
| 1 | 30 | 25:1 | 2230 | 363 | 18 | 37 | 350 | 360 | 370 |
| 2 | 30 | 25:1 | 2200 | 363 | 18 | 36 | 350 | 360 | 370 |
| 3 | 30 | 25:1 | 2230 | 362 | 18 | 38 | 350 | 360 | 370 |
| 4 | 30 | 25:1 | 2210 | 362 | 18 | 33 | 350 | 360 | 370 |
| 5 | 30 | 25:1 | 2250 | 365 | 18 | 39 | 350 | 360 | 370 |
| 6 | 30 | 25:1 | 2350 | 365 | 18 | 43 | 350 | 360 | 370 |
| 7 | 30 | 25:1 | 2330 | 363 | 18 | 40 | 350 | 360 | 370 |
| 8 | 30 | 25:1 | 2360 | 363 | 18 | 38 | 350 | 360 | 370 |
| 9 | 30 | 25:1 | 2390 | 362 | 18 | 39 | 350 | 360 | 370 |
| 10 | * | * | * | * | * | * | * | * | * |
| 11 | 30 | 25:1 | 2960 | 360 | 18 | 41 | 350 | 360 | 370 |
| 12 | 30 | 25:1 | 2560 | 361 | 18 | 39 | 350 | 360 | 370 |
| 13 | 30 | 25:1 | 2580 | 361 | 18 | 42 | 350 | 360 | 370 |
| 14 | 30 | 25:1 | 2400 | 361 | 18 | 36 | 350 | 360 | 370 |
| 15 | 30 | 25:1 | 2410 | 361 | 18 | 37 | 350 | 360 | 370 |
| 16 | 30 | 25:1 | 2590 | 360 | 22 | 42 | 350 | 360 | 370 |
| 17 | 30 | 25:1 | 2500 | 362 | 22 | 42 | 350 | 360 | 370 |
| 18 | 30 | 25:1 | 2500 | 362 | 22 | 42 | 350 | 360 | 370 |
| 19 | 30 | 25:1 | 2540 | 363 | 26 | 40 | 350 | 360 | 370 |
| 20 | 30 | 25:1 | 2710 | 320 | 25 | 49 | 320 | 322 | 325 |
| 21 | 30 | 25:1 | 2720 | 321 | 25 | 47 | 320 | 322 | 325 |

* No data available for this trial run meric material includes at least one polymeric material. The polymeric material may include one or more base resins. In one example, the base resin is High Density Polyethylene (HDPE). In another example, the base resin is a unimodal HDPE. In yet another example, the base resin is unimodal, high-melt strength HDPE. In still yet another example, the base resin is unimodal, high-melt strength HDPE such as DOW® DOWLEX™ IP 41 HDPE (available from The Dow Chemical Company) that has been electron beam modified to provide long chain branching and a melt index of about 0.25 g/10 min. Another example a unimodal, high-melt strength HDPE is EQUISTAR® ALATHON® H5520 HDPE copolymer (available from Lyondell Chemical Company) which has been electron beam modified to have long-chain branching and a melt index of about 0.25 g/10 min. Another example of a suitable unimodal HDPE is FORMOLENE® HB5502F HDPE hexene copolymer (available from Formosa Plastics Corporation).

In certain exemplary embodiments, core-layer formulation 36 may include two base resins that are HDPE. One illustrative example of core-layer formulation 36 includes a first base resin of FORMOLENE® HB5502F HDPE hexene copolymer (available from Formosa Plastics Corporation) and a second base resin of EQUISTAR® ALATHON® H5520 HDPE copolymer (available from Lyondell Chemical Company). In embodiments with more than one HDPE copolymer, different HDPE copolymers can be used depending on the attributes desired in the formulation. For example, core-layer formulation 36 may include both e-beam modified EQUISTAR® ALATHON® H5520 and FORMOLENE® HB5502F HDPE. In such an embodiment the EQUISTAR® ALATHON® H5520 provides higher melt strength which increases foaming potential, and has less flexural modulus or brittleness. The FORMOLENE® HB5502F HDPE provides wide unimodal polydispersity index or distribution and maximizes economic advantage.

In another example, core-layer formulation 36 includes about 50% e-beam modified EQUISTAR® ALATHON® H5520 and about 50% FORMOLENE® HB5502F HDPE. Together the combination provides a film having drop resistance capability associated with a non-modified HDPE resin and increased melt strength of an e-beam modified long-chain branched HDPE. Depending on the desired characteristics, the percentage of two HDPE copolymers may be varied, e.g., 25%/75%, 30%/70%, 35%/65%, 40%/60%, 45%/55%, 50%/50%, etc. In an embodiment, core-layer formulation 36 includes three HDPE copolymers in the base resin. Again, depending on the desired characteristics, the percentage of three HDPE copolymers can be varied, 33%/33%/33%, 30%/30%/40%, 25%/25%/50%, etc.

Core-layer formulations include one or more base resins. The amount of HDPE base resin may be one of several different values or fall within one of several different ranges. It is within the scope of the present disclosure to select an amount of HDPE base resin and be one of the following values: about 85%, 90%, 95%, 97%, 98%, 99%, 99.5%, and 99.9% of the total formulation by weight percentage. It is within the scope of the present disclosure for the amount of HDPE base resin in the formulation to fall within one of many different ranges. In a first set of ranges, the range of HDPE base resin is one of the following ranges: about 85% to 99.9%, 86% to 99.9%, 87% to 99.9%, 87.5% to 99.9%, 88% to 99.9%, 89% to 99.9%, 90% to 99.9%, 91% to 99.9%, 92% to 99.9%, 93% to 99.9%, 94% to 99.9%, 95% to 99.9%, 96% to 99.9%, 96.5% to 99.9%, 97% to 99.9%, and 98% to 99.9%, of the total formulation by weight percentage. In a second set of ranges, the range of HDPE base resin is one of the following ranges: about 85% to 99.5%, 85% to 99%, 85% to 98%, 85% to 97%, 85% to 96%, 85% to 96.5%, 85% to 95%, 85% to 94%, 85% to 93%, 85% to 92%, 85% to 91%, 85% to 90%, 85% to 89%, 85% to 88%, 85% to 87%, and 85% to 86% of the total formulation by weight percentage. In a third set of ranges, the range of HDPE base resin is one of the following ranges: about 87.5% to 96.5%, 87.5% to 96%, 87.5% to 95.5%, 87.5% to 95%, 95% to 99%, 95.5% to 99%, 96% to 99%, and 96.5% to 99% of the total formulation by weight percentage. Each of these values and ranges is embodied in the Examples.

Long chain branching refers to the presence of polymer side chains (branches) that have a length that is comparable or greater than a length of the backbone to which the polymer side chains are coupled to. Long chain branching creates viscoelastic chain entanglements (polymer entanglements) that hamper flow during extensional or oriented stretching and provide for a strain hardening phenomenon. The strain hardening phenomenon may be observed through two analytical methods.

The first analytical method used to observe the presence of strain hardening on an extensional rheometer. During extensional or oriented flow on an extensional rheometer, strain hardening will occur when polymer entanglements do not allow the polymer to flow under Linear Viscoelastic (LVE) conditions. As a result, these polymer entanglements hamper flow and create a deviation from the LVE conditions as observed as a hook formation. The strain hardening phenomenon becomes more severe as strain and strain rate increase due to faster and more severe polymer chain entanglement motion. Virgin polymers without long chain branching will exhibit LVE flow characteristics. In comparison, long chain branched polymers will exhibit strain hardening and which causes a deviation from the LVE flow characteristics of the virgin polymer providing the hook formation under the same test conditions.

The second analytical method used to observe the presence of long chain branching is evaluating melt strength data as tested per ISO 16790 which is incorporated by reference herein in its entirety. An amount of melt strength is known to be directly related to the presence of long chain branching when compared to similar virgin polymers lacking long chain branching. By way of example, Borealis DAPLOY™ WB140HMS Polypropylene (PP) (available from Borealis AG) is compared to other polymers having similar molecular weight, polydispersity index, and other physical characteristics. The DAPLOY™ WB140HMS PP has a melt strength which exceeds about 36 cN while other similar PP resins lacking long chain branching have a melt strength of less than about 10 cN.

Core-layer formulation 36 used to produce the insulative cellular non-aromatic polymeric material may further include one or more cell-forming agents. Cell-forming agents include nucleating agents and blowing agents. A nucleating agent is used to provide and control nucleation sites within a molten formulation to promote formation of cells, bubbles, or voids in the molten formulation during extrusion. A blowing agent is used to grow cells in the molten material at nucleation sites. Blowing agents may be used alone in the formulation or with nucleating agents.

Nucleating agent means a chemical or physical material that provides sites for cells to form in a molten formulation mixture. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

A core-layer formulation can include a physical nucleating agent. The amount of a physical nucleating agent may be one of several different values or fall within one of several different ranges. It is within the scope of the present disclosure to select an amount of a physical nucleating agent and be one of the following values: about 0%, 0.1%, 0.25%, 0.5%, 0.75%, 1%, 1.25%, 1.5%, 1.75%, 2%, 2.25%, 2.5%, 3%, 4%, 5%, 6%, or 7% of the total formulation by weight percentage. It is within the scope of the present disclosure for the amount of a physical nucleating agent in the formulation to fall within one of many different ranges. In a first set of ranges, the range of a physical nucleating agent is one of the following ranges: about 0% to 7% (w/w), 0.1% to 7%, 0.25% to 7%, 0.5% to 7%, 0.75% to 7%, 1% to 7%, 1.25% to 7%, about 1.5% to 7%, 1.75% to 7%, 2.0% to 7%, 2.25% to 7%, 2.5% to 7%, 3% to 7%, 4% to 7%, 5% to 7%, and 6% to 7% of the total formulation by weight percentage. In a second set of ranges, the range of a physical nucleating agent is one of the following ranges: about 0% to 6%, 0% to 5%, 0% to 4%, 0% to 3%, 0% to 2.5%, 0% to 2.25%, 0% to 2%, 0% to 1.75%, 0% to 1.5%, 0% to 1.25%, 0% to 1%, 0% to 0.75%, and 0% to 0.5% of the total formulation by weight percentage. In a third set of ranges, the range of a physical nucleating agent is one of the following ranges: about 0.1% to 6%, 0.1% to 5%, 0.1% to 4%, 0.1% to 3.5%, 0.1% to 3%, 0.1% to 2.5%, 0.1% to 2.25%, 0.1% to 2%, 0.1% to 1.75%, 0.1% to 1.5%, 0.1% to 1.25%, 0.1% to 1%, 0.1% to 0.75%, and 0.1% to 0.5% of the total formulation by weight percentage. In an embodiment, the formulation lacks talc. Each of these values and ranges is embodied in the Examples.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

A core-layer formulation can include a nucleating agent. The amount of a nucleating agent may be one of several different values or fall within one of several different ranges. It is within the scope of the present disclosure to select an amount of a nucleating agent and be one of the following values: about 0.1%, 0.25%, 0.5%, 0.75%, 1%, 1.5%, 2%, 2.5%, 3%, 3.5%, 4%, 5%, 10%, and 15% of the total formulation by weight percentage. It is within the scope of the present disclosure for the amount of a nucleating agent in the formulation to fall within one of many different ranges. In a first set of ranges, the range of a nucleating agent is one of the following ranges: about 0.1% to 15%, 0.25% to 15%, 0.5% to 15%, 1% to 15%, 1.5% to 15%, 2% to 15%, 2.5% to 15%, 3% to 15%, 3.5% to 15%, 4% to 15%, 4.5% to 15%, and 5% to 15% of the total formulation by weight percentage. In a second set of ranges, the range of a nucleating agent is one of the following ranges: about 0.1% to 10%, 0.25% to 10%, 0.5% to 10%, 0.75% to 10%, 1% to 10%, 1.5% to 10%, 2% to 10%, 2.5% to 10%, 3% to 10%, 3.5% to 10%, 4% to 10%, 4.5% to 10%, and 5% to 10% of the total formulation by weight percentage. In a third set of ranges, the range of a nucleating agent is one of the following ranges: about 0.1% to 5%, 0.25% to 5%, 0.5% to 5%, 0.75% to 5%, 1% to 5%, 1.5% to 5%, 2% to 5%, 2.5% to 5%, 3% to 5%, 3.5% to 5%, 4% to 5%, and 4.5% to 5% of the total formulation by weight percentage. Each of these values and ranges is embodied in the Examples.

A blowing agent refers to a physical or a chemical material (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent.

In another example, chemical blowing agents may be selected from the group consisting of azodicarbonamide; azodiisobutyro-nitrile; benzenesulfonhydrazide; 4,4-oxybenzene sulfonylsemicarbazide; p-toluene sulfonyl semicarbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoro ethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide, and combinations thereof.

In one aspect of the present disclosure, where a chemical blowing agent is used, the chemical blowing agent may be introduced into the material formulation that is added to the hopper.

One example of a physical blowing agent is nitrogen ($N_2$). The $N_2$ is pumped into the molten formulation via a port in the extruder as a supercritical fluid. The molten material with the N₂ in suspension then exits the extruder via a die where a pressure drop occurs. As the pressure drop happens, N₂ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide (CO₂), helium, argon, air, pentane, butane, or other alkane mixtures of the foregoing and the like. In an illustrative example, a physical blowing agent may be introduced at a rate of about 0.02 pounds per hour to about 0.15 pounds per hour. In still yet another illustrative example, the physical blowing agent may be introduced at a rate of about 0.05 pounds per hours to about 0.15 pounds per hour.

In one aspect of the present disclosure, at least one slip agent may be incorporated into the formulation to aid in increasing production rates. Slip agent (also known as a process aid) is a term used to describe a general class of materials which are added to the formulation and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated C-18) through erucyl (C-22 single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a suitable slip agent is Ampacet 102823 Process Aid PE MB LLDPE.

A core-layer formulation can include a slip agent. The amount of a slip agent may be one of several different values or fall within one of several different ranges. It is within the scope of the present disclosure to select an amount of a slip agent and be one of the following values: about 0%, 0.1%, 0.25%, 0.5%, 0.75%, 1%, 1.25%, 1.5%, 1.75%, 2%, 2.25%, 2.5%, and 3%, of the total formulation by weight percentage. It is within the scope of the present disclosure for the amount of a slip agent in the formulation to fall within one of many different ranges. In a first set of ranges, the range of a slip agent is one of the following ranges: about 0% to 3%, 0.1% to 3%, 0.25% to 3%, 0.5% to 3%, 1% to 3%, 1.25% to 3%, 1.5% to 3%, 1.75% to 3%, 2% to 3%, 2.25% to 3%, and 2.5% to 3% of the total formulation by weight percentage. In a second set of ranges, the range of a slip agent is one of the following ranges: about 0% to 2.5%, 0% to 2%, 0% to 1.75%, 0% to 1.5%, 0% to 1.25%, 0% to 1%, 0% to 0.75%, 0% to 0.5%, and 0.1% to 2.5% of the total formulation by weight percentage. In a third set of ranges, the range of a slip agent is one of the following ranges: about 0.1% to 2.5%, 0.1% to 2%, 0.1% to 1.75%, 0.1% to 1.5%, 0.1% to 1.25%, 0.1% to 1%, 0.1% to 0.75%, and 0.1% to 0.5% of the total formulation by weight percentage. Each of these values and ranges is embodied in the Examples.

In another aspect of the present disclosure, an impact modifier may be incorporated into the formulation to minimize fracturing of the insulative cellular non-aromatic polymeric material when subjected to an impact such as a drop test. One representative example of a suitable impact modifier is DOW® AFFINITY™ PL 1880G polyolefin plastomer.

A core-layer formulation can include a colorant. The amount of a colorant may be one of several different values or fall within one of several different ranges. It is within the scope of the present disclosure to select an amount of a colorant and be one of the following values: about 0%, 0.1%, 0.25%, 0.5%, 0.75%, 1%, 1.25%, 1.5%, 1.75%, 2%, 2.25%, 2.5%, 3%, and 4% of the total formulation by weight percentage. It is within the scope of the present disclosure for the amount of a slip agent in the formulation to fall within one of many different ranges. In a first set of ranges, the range of a colorant is one of the following ranges: about 0% to 4%, 0.1% to 4%, 0.25% to 4%, 0.5% to 4%, 1% to 4%, 1.25% to 4%, 1.5% to 4%, 1.75% to 4%, 2% to 4%, 2.25% to 4%, 2.5% to 4%, and 3% to 4% of the total formulation by weight percentage. In a second set of ranges, the range of a colorant is one of the following ranges: about 0% to 3%, 0% to 2.5%, about 0% to 2.25%, 0% to 2%, 0% to 1.75%, 0% to 1.5%, 0% to 1.25%, 0% to 1%, 0% to 0.75%, and 0% to 0.5% of the total formulation by weight percentage. In a third set of ranges, the range of a slip agent is one of the following ranges: about 0.1% to 3.5%, 0.1% to 3.0%, 0.1% to 2.5%, 0.1% to 2.25%, 0.1% to 2%, 0.1% to 1.75%, 0.1% to 1.5%, 0.1% to 1.25%, 0.1% to 1%, 0.1% to 0.75%, and 0.1% to 0.5% of the total formulation by weight percentage. Each of these values and ranges is embodied in the Examples.

Various core-layer formulations 36 were ran through core-layer extruder 24 for various trial runs. Table 3 below shows some operating parameters for core-layer extruder 24 for each trial run include screw size dimension. In these illustrative examples, the screw used was a modified barrier screw. Each screw used in core-layer extruder 24, may be defined using a diameter and an L/D ratio where "L" is the length of the screw and "D" is the diameter of the screw. Table 4 below shows some other operating parameters for core-layer extruder 24 for each trial run.

TABLE 3

Core-Layer Extruder Operating Parameter

| Trial Run Number | Screw Size (mm) | L/D Ratio | Melt Pressure (PSI) | Melt Temp | Screw RPM | N2 Injection Pressure (PSI) |
|---|---|---|---|---|---|---|
| 1 | 60 | 32:1 | 2,800 | 351 | 30 | 2,856 |
| 2 | 60 | 32:1 | 2,780 | 351 | 30 | 2,826 |
| 3 | 60 | 32:1 | 2,840 | 351 | 30 | 2,902 |
| 4 | 60 | 32:1 | 2,840 | 352 | 30 | 2,896 |
| 5 | 60 | 32:1 | 2,860 | 352 | 30 | 2,926 |
| 6 | 60 | 32:1 | 2,880 | 351 | 30 | 2,950 |
| 7 | 60 | 32:1 | 2,870 | 351 | 30 | 2,938 |
| 8 | 60 | 32:1 | 2,950 | 345 | 30 | 3,018 |
| 9 | 60 | 32:1 | 3,070 | 336 | 30 | 3,178 |
| 10 | 60 | 32:1 | 3,160 | 329 | 30 | 3,258 |
| 11 | 60 | 32:1 | 3,160 | 330 | 30 | 3,260 |
| 12 | 60 | 32:1 | 3,210 | 330 | 30 | 3,302 |
| 13 | 60 | 32:1 | 3,230 | 331 | 30 | 3,308 |
| 14 | 60 | 32:1 | 3,080 | 333 | 30 | 3,164 |
| 15 | 60 | 32:1 | 3,120 | 330 | 30 | 3,208 |
| 16 | 60 | 32:1 | 3,150 | 329 | 30 | 3,240 |
| 17 | 60 | 32:1 | 3,060 | 331 | 30 | 3,142 |
| 18 | 60 | 32:1 | 3,060 | 331 | 30 | 3,146 |
| 19 | 60 | 32:1 | 3,050 | 335 | 30.1 | 3,134 |
| 20 | 60 | 32:1 | 3,040 | 319 | 30 | 3,034 |
| 21 | 60 | 32:1 | 3,070 | 319 | 30 | 3,074 |

* No data available for this trial run

TABLE 4

Additional Core-Layer Extruder Operating Parameters

| Trial Run Number | Temp Zone 1 (° F.) | Temp Zone 2 (° F.) | Temp Zone 3 (° F.) | Temp Zone 4 (° F.) | Temp Zone 5 (° F.) | Temp Zone 6 (° F.) | Temp Zone 7 (° F.) |
|---|---|---|---|---|---|---|---|
| 1 | 330 | 340 | 350 | 350 | 370 | 355 | 350 |
| 2 | 330 | 340 | 350 | 350 | 370 | 355 | 350 |
| 3 | 330 | 340 | 350 | 350 | 370 | 355 | 350 |
| 4 | 330 | 340 | 350 | 350 | 370 | 355 | 350 |
| 5 | 330 | 340 | 350 | 350 | 370 | 355 | 350 |
| 6 | 330 | 340 | 350 | 350 | 370 | 355 | 350 |
| 7 | 330 | 340 | 350 | 350 | 370 | 355 | 350 |
| 8 | 330 | 340 | 350 | 350 | 350 | 350 | 350 |
| 9 | 350 | 345 | 340 | 350 | 330 | 330 | 330 |
| 10 | 350 | 345 | 360 | 350 | 320 | 320 | 320 |
| 11 | 350 | 345 | 360 | 350 | 320 | 320 | 320 |
| 12 | 350 | 345 | 360 | 350 | 320 | 320 | 320 |
| 13 | 350 | 345 | 360 | 350 | 320 | 320 | 320 |
| 14 | 350 | 345 | 360 | 350 | 320 | 320 | 320 |
| 15 | 350 | 345 | 360 | 350 | 320 | 320 | 320 |
| 16 | 350 | 345 | 360 | 350 | 320 | 320 | 320 |
| 17 | 350 | 345 | 360 | 350 | 320 | 320 | 320 |
| 18 | 350 | 345 | 360 | 350 | 320 | 320 | 320 |
| 19 | 350 | 345 | 360 | 350 | 320 | 320 | 320 |
| 20 | 300 | 310 | 315 | 320 | 320 | 320 | 320 |
| 21 | 300 | 310 | 315 | 320 | 320 | 320 | 320 |

* No data available for this trial run

In an embodiment, core-layer formulation 36 is processed by core-layer extruder 24 and extruded between inner and outer layers 14, 16 to produce multiple layer tube 10, also called multiple layer parison 10, as shown in FIG. 1. The density may be one of several different values or fall within one of several different ranges. It is within the scope of the present disclosure to select a density and be one of the following values: about 0.3, 0.35, 0.4, 0.45, 0.5, 0.55, 0.6, 0.65, 0.7, 0.75, 0.785, and 0.8 g/cm$^3$. It is within the scope of the present disclosure for the density of the formulation to fall within one of many different ranges. In a first set of ranges, the range of density is one of the following ranges: about 0.3 g/cm$^3$ to 0.8 g/cm$^3$, 0.35 g/cm$^3$ to 0.8 g/cm$^3$, 0.4 g/cm$^3$ to 0.8 g/cm$^3$, 0.45 g/cm$^3$ to 0.8 g/cm$^3$, 0.5 g/cm$^3$ to 0.8 g/cm$^3$, 0.55 g/cm$^3$ to 0.8 g/cm$^3$, 0.6 g/cm$^3$ to 0.8 g/cm$^3$, 0.65 g/cm$^3$ to 0.8 g/cm$^3$, 0.7 g/cm$^3$ to 0.8 g/cm$^3$, and 0.75 g/cm$^3$ to 0.8 g/cm$^3$. In a second set of ranges, the range of density is one of the following ranges: about 0.35 g/cm$^3$ to 0.785 g/cm$^3$, 0.4 g/cm$^3$ to 0.785 g/cm$^3$, 0.45 g/cm$^3$ to 0.785 g/cm$^3$, 0.5 g/cm$^3$ to 0.785 g/cm$^3$, 0.55 g/cm$^3$ to 0.785 g/cm$^3$, 0.6 g/cm$^3$ to 0.785 g/cm$^3$, 0.65 g/cm$^3$ to 0.785 g/cm$^3$, 0.7 g/cm$^3$ to 0.785 g/cm$^3$, and 0.75 g/cm$^3$ to 0.785 g/cm$^3$. In a third set of ranges, the range of density is one of the following ranges: about 0.4 g/cm$^3$ to 0.7 g/cm$^3$, 0.45 g/cm$^3$ to 0.7 g/cm$^3$, 0.5 g/cm$^3$ to 0.7 g/cm$^3$, 0.55 g/cm$^3$ to 0.7 g/cm$^3$, 0.6 g/cm$^3$ to 0.7 g/cm$^3$, and 0.65 g/cm$^3$ to 0.7 g/cm$^3$. In a fourth set of ranges, the range of density is one of the following ranges: about 0.4 g/cm$^3$ to 0.65 g/cm$^3$, 0.45 g/cm$^3$ to 0.65 g/cm$^3$, 0.5 g/cm$^3$ to 0.6 g/cm$^3$, 0.55 g/cm$^3$ to 0.65 g/cm$^3$, 0.6 g/cm$^3$ to 0.65 g/cm$^3$, 0.4 g/cm$^3$ to 0.6 g/cm$^3$, 0.45 g/cm$^3$ to 0.6 g/cm$^3$, 0.5 g/cm$^3$ to 0.6 g/cm$^3$, 0.4 g/cm$^3$ to 0.55 g/cm$^3$, 0.45 g/cm$^3$ to 0.55 g/cm$^3$, 0.5 g/cm$^3$ to 0.55 g/cm$^3$, 0.4 g/cm$^3$ to 0.5 g/cm$^3$, and 0.45 g/cm$^3$ to 0.5 g/cm$^3$. Each of these values and ranges is embodied in the Examples. Density was determined according to the density test procedure outlined in Example 2.

In an embodiment, multiple layer tube 10 includes core layer 18 located between inner and outer layers 14, 16. The density of the multiple layer tube may be one of several different values or fall within one of several different ranges. It is within the scope of the present disclosure to select a density and be one of the following values: about 0.1, 0.15, 0.2, 0.25, 0.3, 0.35, 0.4, 0.45, 0.5, 0.55, 0.6, 0.65, 0.7, 0.75, 0.785, and 0.8 g/cm$^3$. It is within the scope of the present disclosure for the density of the formulation to fall within one of many different ranges. In a first set of ranges, the range of density is one of the following ranges: about 0.1 g/cm$^3$ to 0.8 g/cm$^3$, 0.15 g/cm$^3$ to 0.8 g/cm$^3$, 0.2 g/cm$^3$ to 0.8 g/cm$^3$, 0.25 g/cm$^3$ to 0.8 g/cm$^3$, 0.3 g/cm$^3$ to 0.8 g/cm$^3$, 0.35 g/cm$^3$ to 0.8 g/cm$^3$, 0.4 g/cm$^3$ to 0.8 g/cm$^3$, 0.45 g/cm$^3$ to 0.8 g/cm$^3$, 0.5 g/cm$^3$ to 0.8 g/cm$^3$, 0.55 g/cm$^3$ to 0.8 g/cm$^3$, 0.6 g/cm$^3$ to 0.8 g/cm$^3$, 0.65 g/cm$^3$ to 0.8 g/cm$^3$, 0.7 g/cm$^3$ to 0.8 g/cm$^3$, and 0.75 g/cm$^3$ to 0.8 g/cm$^3$. In a second set of ranges, the range of density is one of the following ranges: about 0.1 g/cm$^3$ to 0.75 g/cm$^3$, 0.1 g/cm$^3$ to 0.7 g/cm$^3$, 0.1 g/cm$^3$ to 0.65 g/cm$^3$, 0.1 g/cm$^3$ to 0.6 g/cm$^3$, 0.1 g/cm$^3$ to 0.55 g/cm$^3$, 0.1 g/cm$^3$ to 0.5 g/cm$^3$, 0.1 g/cm$^3$ to 0.45 g/cm$^3$, 0.1 g/cm$^3$ to 0.4 g/cm$^3$, 0.1 g/cm$^3$ to 0.35 g/cm$^3$, 0.1 g/cm$^3$ to 0.3 g/cm$^3$, 0.1 g/cm$^3$ to 0.25 g/cm$^3$, 0.1 g/cm$^3$ to 0.2 g/cm$^3$, and 0.1 g/cm$^3$ to 0.15 g/cm$^3$. Each of these values and ranges is embodied in the Examples. Density was determined according to the density test procedure outlined in Example 2.

Together, inner-layer, outer-layer, and core-layer parisons 30, 34, 36 were provided to co-extrusion die 26. There the parisons 30, 34, 36 were aligned and extruded together to establish multiple layer tube 10. Various formulations 28, 32, 26, were passed through associated extruders 20, 22, 24 to establish associated parisons 30, 34, 36 which were then passed through co-extrusion die 26. Table 5 below shows operating parameters of co-extrusion die 26 for the various trial runs. Co-extrusion die 26 includes, for example, a W. Müller Co-Ex 6 head and lower tooling as shown in FIG. 4.

TABLE 5

Co-extrusion Die Operating Parameters

| Trial Run Number | Head Type | Head Temp Divider Top (° F.) | Head Temp Divider Bottoms-Sides (° F.) | Head Temp Lower Housing (° F.) | Head Temp Upper Housing (° F.) | Front Temp Divider Top (° F.) | Front Temp Divider Bottom (° F.) | Front Temp Bushing (° F.) |
|---|---|---|---|---|---|---|---|---|
| 1 | W. Müller Co-Ex 6 | 330 | 330 | 330 | 330 | 330 | — | 350 |
| 2 | W. Müller Co-Ex 6 | 330 | 330 | 330 | 330 | 330 | — | 350 |
| 3 | W. Müller Co-Ex 6 | 330 | 330 | 330 | 330 | 330 | — | 350 |
| 4 | W. Müller Co-Ex 6 | 330 | 330 | 330 | 330 | 330 | — | 350 |

TABLE 5-continued

Co-extrusion Die Operating Parameters

| Trial Run Number | Head Type | Head Temp Divider Top (° F.) | Head Temp Divider Bottoms-Sides (° F.) | Head Temp Lower Housing (° F.) | Head Temp Upper Housing (° F.) | Front Temp Divider Top (° F.) | Front Temp Divider Bottom (° F.) | Front Temp Bushing (° F.) |
|---|---|---|---|---|---|---|---|---|
| 5 | W. Müller Co-Ex 6 | 330 | 330 | 330 | 330 | 330 | — | 350 |
| 6 | W. Müller Co-Ex 6 | 330 | 330 | 330 | 330 | 330 | — | 350 |
| 7 | W. Müller Co-Ex 6 | 330 | 330 | 330 | 330 | 330 | — | 350 |
| 8 | W. Müller Co-Ex 6 | 330 | 330 | 330 | 330 | 330 | — | 350 |
| 9 | W. Müller Co-Ex 6 | 330 | 330 | 330 | 330 | 330 | — | 335 |
| 10 | W. Müller Co-Ex 6 | 330 | 330 | 330 | 330 | 330 | — | 320 |
| 11 | W. Müller Co-Ex 6 | 330 | 330 | 330 | 330 | 330 | — | 320 |
| 12 | W. Müller Co-Ex 6 | 330 | 330 | 330 | 330 | 330 | — | 320 |
| 13 | W. Müller Co-Ex 6 | 330 | 330 | 330 | 330 | 330 | — | 320 |
| 14 | W. Müller Co-Ex 6 | 330 | 330 | 330 | 330 | 330 | — | 320 |
| 15 | W. Müller Co-Ex 6 | 330 | 330 | 330 | 330 | 330 | — | 320 |
| 16 | W. Müller Co-Ex 6 | 330 | 330 | 330 | 330 | 330 | — | 320 |
| 17 | W. Müller Co-Ex 6 | 330 | 330 | 330 | 330 | 330 | — | 320 |
| 18 | W. Müller Co-Ex 6 | 330 | 330 | 330 | 330 | 330 | — | 320 |
| 19 | W. Müller Co-Ex 6 | 330 | 330 | 330 | 330 | 330 | — | 320 |
| 20 | W. Müller Co-Ex 6 | 320 | 305 | 305 | 305 | 305 | — | 350 |
| 21 | W. Müller Co-Ex 6 | 320 | 305 | 305 | 305 | 305 | — | 350 |

* No data available for this trial run

According to an aspect of the present invention, there is provided a method of forming a multi-layer parison formed from an insulative cellular non-aromatic polymeric material, the parison comprising an inner parison, an outer parison and a core parison disposed between the inner parison and the outer parison, the method comprising the steps of:
(a) extruding an inner-layer formulation to form the inner parison,
(b) extruding a core-layer formulation to form the core parison,
(c) extruding an outer-layer formulation to form the outer parison,
(d) aligning the inner parison from step (a), the core parison from step (b), and the outer parison from step (c) such that the core parison is located between the inner parison and the outer parison to form an extruded multi-layer parison, wherein the multi-layer parison has a density of about 0.4 g/cm3 to 0.5 g/cm3.

The inner, core and outer parisons forming the multi-layer parison are disposed one directly on top of the other, in the sense that the core parison is coupled to the inner parison on one side and the outer parison on the other side.

In an embodiment, in step (d), the inner parison from step (a), the core parison from step (b), and the outer parison from step (c) are aligned such that the core parison is located between the inner parison and the outer parison and the aligned parisons are then co-extruded to form the multi-layer parison. Suitably, co-extrusion may be performed without the use of a tandem extruder.

In an embodiment, the multi-later parison is extruded in the form of a multi-layer tube in which the core parison surrounds the inner parison and the outer parison surrounds the core parison.

In another embodiment, the outer and inner skin layers each comprise a high density polymeric material. Suitably, the high-density polymeric material is high density polyethylene. In an embodiment, the high density polyethylene is a HDPE hexene copolymer. In a particular embodiment, the high density polyethylene is FORMOLENE® HB5502F HDPE hexene copolymer (available from Formosa Plastics Corporation).

In certain embodiment, one or both of the inner and outer layers comprise a high-density polymeric material as hereinbefore defined and a colorant. For example, one or both of the inner and outer layers may comprise 95-99.9% (w/w) of a high-density polymeric material as hereinbefore defined and 0.1 to 5% (w/w) a colorant. In an embodiment, one or both of the inner and outer layers may comprise 97-99.9% (w/w) of a high-density polymeric material as hereinbefore defined and 0.1 to 3% (w/w) a colorant. In a further embodiment, one or both of the inner and outer layers may comprise 98-99.5% (w/w) of a high-density polymeric material as hereinbefore defined and 0.5 to 2% (w/w) a colorant. The relatively high-density polymeric material may be FORMOLENE® HB5502F HDPE hexene copolymer (available from Formosa Plastics Corporation) and the colorant may be COLORTECH® 11933-19 Titanium Oxide Colorant (available from COLORTECH® a PPM Company).

In some examples, inner-layer formulation and outer-layer formulation may be the same. In other examples, inner-layer formulation and outer-layer formulation may be different.

The core formulation is suitably as defined hereinbefore. In an embodiment, the core formulation comprises:
85-99.9% (w/w) of a high density polyethylene (HDPE) as defined herein;
0.1-15% (w/w) of a nucleating agent as defined herein;
0-3% (w/w) of a slip agent as defined herein; and
0-4% (w/w) of a colorant as defined herein.

In a further embodiment, the core formulation comprises:
97-99.9% (w/w) of a high density polyethylene (HDPE) as defined herein;
0.1-3% (w/w) of a nucleating agent as defined herein;
0-3% (w/w) of a slip agent as defined herein; and
0-3% (w/w) of a colorant as defined herein.

According to another aspect of the present disclosure, there is provided a multi-layer parison obtainable, obtained, or directly obtained by a process defined herein.

In another embodiment, the method further comprises a step e) of blow-molding the multi-layer parison resulting from step d) to provide a container formed from insulative cellular non-aromatic polymeric material.

According to another aspect of the present disclosure, there is provided a method of forming a contained formed from a multi-later parison, wherein the multilayer parison is formed from an insulative cellular non-aromatic polymeric material and comprises an inner parison, an outer parison and a core parison disposed between the inner parison and the outer parison, the method comprising the steps of:

(a) extruding an inner-layer formulation to form the inner parison, (b) extruding a core-layer formulation to form the core parison, (c) extruding an outer-layer formulation to form the outer parison, (d) aligning the inner parison from step (a), the core parison from step (b), and the outer parison from step (c) such that the core parison is located between the inner parison and the outer parison to form an extruded multi-layer parison;

(e) blow-molding the multi-layer parison resulting from step d) to provide a container formed from insulative cellular non-aromatic polymeric material, wherein the multi-layer parison has a density of about 0.4 g/cm3 to 0.5 g/cm3.

According to another aspect of the present disclosure, there is provided a container obtainable, obtained, or directly obtained by a process defined herein.

The following numbered clauses include embodiments that are contemplated and non-limiting:

Clause 1. A method of producing a multiple layer tube, the method comprising the steps of
extruding an inner-layer formulation to form an inner parison,
extruding a core-layer formulation to form a core parison,
extruding an outer-layer formulation to form an outer parison,
aligning the inner parison, the core parison, and the outer parison to cause the core parison to be located between the inner parison and the outer parison to cause the core parison to surround the inner parison and to be surrounded by the outer parison to form an extruded multiple layer tube,
wherein the multiple layer tube has a density of about 0.35 g/cm$^3$ to 0.55 g/cm$^3$.

Clause 2. A method of producing a multiple layer tube, the method comprising the steps of
extruding an inner-layer formulation to form an inner parison,
extruding a core-layer formulation to form a core parison,
extruding an outer-layer formulation to form an outer parison,
aligning the inner parison, the core parison, and the outer parison to cause the core parison to be located between the inner parison and the outer parison to cause the core parison to surround the inner parison and to be surrounded by the outer parison to form an extruded multiple layer tube,
wherein the core-layer formulation is made from an insulative cellular non-aromatic polymeric material comprising up to about 99.9% (w/w) of a high density polyethylene base resin, up to about 1% (w/w) of a colorant, up to about 15% (w/w) of a nucleating agent.

Clause 3. A multiple layer tube comprising
an inner layer forming a boundary of an interior region of the multiple layer tube,
an outer layer arranged to lie in spaced-apart relation to the inner layer to define a core chamber between the outer layer and the inner layer, and
and a core layer located in the core chamber,
wherein the multiple layer tube has a density in a range of about 0.3 g/cm$^3$ to about 0.6 g/cm$^3$.

Clause 4. The method of any other clause, wherein the multiple layer tube is formed to include an interior region and the inner parison forms a boundary of the interior region, the outer parison is spaced-apart from the inner parison to define a core chamber therebetween, and the core parison is located between the inner and outer parisons in the core chamber.

Clause 5. The method of any other clause, wherein the density of the multiple layer tube is in a range of about 0.35 g/cm$^3$ to 0.45 g/cm$^3$.

Clause 6. The method of any other clause, wherein the multiple layer tube has a density of about 0.4 g/cm$^3$ and the core parison has a density less than a density of the inner parison.

Clause 7. The method of any other clause, wherein the core parison has a density of about 0.1 g/cm$^3$ to 0.8 g/cm$^3$.

Clause 8. The method of any other clause, wherein the core parison has a density of about 0.3 g/cm$^3$ to 0.5 g/cm3.

Clause 9. The method of any other clause, wherein the core parison has a density of about 0.3 g/cm$^3$ to 0.35 g/cm$^3$.

Clause 10. The method of any other clause, wherein the core parison has a density of about 0.32 g/cm$^3$.

Clause 11. The method of any other clause, wherein the core parison has a density less than a density of the outer parison.

Clause 12. The method of any other clause, wherein the density of the inner parison is about equal to the density of the outer parison.

Clause 13. The method of any other clause, wherein the multiple layer tube has a density of about 0.4 g/cm$^3$ and the core parison has a density less than a density of the outer parison.

Clause 14. The method of any other clause, wherein the outer-layer formulation comprises a high density polymeric material.

Clause 15. The method of any other clause, wherein the inner-layer formulation comprises a high density polymeric material.

Clause 16. The method of any other clause, wherein the high density polymeric material comprises high density polyethylene (HDPE).

Clause 17. The method of any other clause, wherein the HDPE is a HDPE hexene copolymer.

Clause 18. The method of any other clause, wherein the inner-layer formulation and the outer-layer formulation are a different formulation.

Clause 19. The method of any other clause, wherein the inner-layer formulation and the outer-layer formulation are the same formulation.

Clause 20. The method of any other clause, wherein the core-layer formulation comprises an insulative cellular non-aromatic polymeric material.

Clause 21. The method of any other clause, wherein the core-layer formulation comprises one or more high density polyethylene base resins (HDPE).

Clause 22. The method of any other clause, wherein the HDPE is unimodal.

Clause 23. The method of any other clause, wherein the unimodal HDPE is a unimodal, high-melt strength HDPE.

Clause 24. The method of any other clause, wherein the unimodal, high-melt strength HDPE is electron beam modified.

Clause 25. The method of any other clause, wherein the electron beam modified unimodal, high-melt strength HDPE has long chain branching and a melt index of about 0.25 g/10 min.

Clause 26. The method of any other clause, wherein the one or more HDPE base resins is two HDPE base resins.

Clause 27. The method of any other clause, wherein the two polyethylene base resins are 50% of each base resin.

Clause 28. The method of any other clause, wherein the base resins are 50% of a unimodal HDPE and 50% of an electron beam modified HDPE.

Clause 29. The method of any other clause, wherein the core-layer formulation comprises about 85% to 99.9% (w/w) HDPE base resin.

Clause 30. The method of any other clause, wherein the core-layer formulation comprises about 97% to about 99.9% HDPE base resin.

Clause 31. The method of any other clause, wherein the core-layer formulation comprises about 98% to about 99.9% HDPE base resin.

Clause 32. The method of any other clause, wherein the core-layer formulation comprises a nucleating agent.

Clause 33. The method of any other clause, wherein the nucleating agent is about 0.1% to 15% (w/w) of the core-layer formulation.

Clause 34. The method of any other clause, wherein the nucleating agent is a chemical nucleating agent, a physical nucleating agent, or both a chemical nucleating agent and a physical nucleating agent.

Clause 35. The method of any other clause, wherein the physical nucleating agent is selected from the group consisting of talc, calcium carbonate, mica, and mixtures thereof.

Clause 36. The method of any other clause, wherein the physical nucleating agent is about 0% to 7% (w/w) of the core-layer formulation.

Clause 37. The method of any other clause, wherein the physical nucleating agent is about 0.1% to 0.5% (w/w) of the core-layer formulation.

Clause 38. The method of any other clause, wherein the physical nucleating agent is talc.

Clause 39. The method of any other clause, wherein the core-layer formulation lacks talc.

Clause 40. The method of any other clause, wherein the chemical nucleating agent is a blowing agent.

Clause 41. The method of any other clause, wherein the blowing agent is citric acid or a citric acid-based material.

Clause 42. The method of any other clause, wherein the chemical blowing agent is a composition comprising citric acid and a crystal nucleating agent.

Clause 43. The method of any other clause, wherein the chemical blowing agent is selected from the group consisting of azodicarbonamide; azodiisobutyro-nitrile; benzenesulfonhydrazide; 4,4-oxybenzene sulfonylsemicarbazide; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoro-ethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis (benzene sulfonyl hydrazide); diphenyl sulfone-3,3'-disulfonyl hydrazide; calcium azide; 4,4'-diphenyl disulfonyl azide; and p-toluene sulfonyl azide.

Clause 44. The method of any other clause, wherein the core-layer formulation further comprises a physical blowing agent.

Clause 45. The method of any other clause, wherein the physical blowing agent is selected from the group consisting of carbon dioxide, nitrogen, helium, argon, air, an alkane, and mixtures thereof.

Clause 46. The method of any other clause, wherein the alkane is pentane or butane.

Clause 47. The method of any other clause, wherein the core-layer formulation further comprises a slip agent.

Clause 48. The method of any other clause, wherein the slip agent is about 0% to 3% (w/w) of the core-layer formulation.

Clause 49. The method of any other clause, wherein the slip agent is an amide of fat or fatty acid, a low molecular weight amide, or fluoroelastomer.

Clause 50. The method of any other clause, wherein the fatty acid amide is a single unsaturated $C_{18}$ to $C_{22}$ amide.

Clause 51. The method of any other clause, wherein the fatty acid amide is erucamide or oleamide.

Clause 52. The method of any other clause, wherein the core-layer formulation further comprises a colorant.

Clause 53. The method of any other clause, wherein the colorant is titanium dioxide.

Clause 54. The method of any other clause, wherein the colorant is about 0% to 4% (w/w) of the core-layer formulation.

Clause 55. The method of any other clause, wherein the core-layer formulation comprises polypropylene.

Clause 56. The method of any other clause, wherein the inner-layer formulation, the outer-layer formulation, and the core-layer formulation each comprise polypropylene.

Clause 57. The method of any other clause, wherein the core parison has a density of about 0.01 g/cm³ to 0.19 g/cm³.

Clause 58. The method of any other clause, wherein the core parison has a density of about 0.05 g/cm³ to 0.19 g/cm³.

Clause 59. The method of any other clause, wherein the multiple layer tube has a density of about 0.4 g/cm³ to 0.5 g/cm³.

Clause 60. The method of any other clause, wherein the density of the multiple layer tube is in a range of about 0.42 g/cm³ to 0.44 g/cm³.

Clause 61. The method of any other clause, wherein the core parison has a density less than a density of the inner parison.

Clause 62. The method of any other clause, wherein the core parison has a density less than a density of the outer parison.

Clause 63. The method of any other clause, wherein the density of the inner parison is about equal to the density of the outer parison.

Clause 64. The method of any other clause, wherein the high density polyethylene base resin is a hexene copolymer.

Clause 65. The method of any other clause, wherein the high density polyethylene base resin is unimodal and has a high melt strength.

Clause 66. The method of any other clause, wherein the high density polyethylene base resin is electron beam modified.

Clause 67. The method of any other clause, wherein the high density polyethylene base resin has long chain branching and a melt index of about 0.25 g/10 min.

Clause 68. The method of any other clause, wherein the core-layer formulation comprises about 97% to about 99.9% of the high density polyethylene base resin.

Clause 69. The method of any other clause, wherein the core-layer formulation comprises about 98% to about 99.9% of the high density polyethylene base resin.

Clause 70. The method of any other clause, wherein the nucleating agent is about 0.1% to 15% (w/w) of the core-layer formulation.

Clause 71. The method of any other clause, wherein the nucleating agent is a chemical nucleating agent, a physical nucleating agent, or both a chemical nucleating agent and a physical nucleating agent.

Clause 72. The method of any other clause, wherein the physical nucleating agent is selected from the group consisting of talc, calcium carbonate, mica, and mixtures thereof.

Clause 73. The method of any other clause, wherein the physical nucleating agent is about 0% to 7% (w/w) of the core-layer formulation.

Clause 74. The method of any other clause, wherein the physical nucleating agent is about 0.1% to 0.5% (w/w) of the core-layer formulation.

Clause 75. The method of any other clause, wherein the physical nucleating agent is talc.

Clause 76. The method of any other clause, wherein the core-layer formulation lacks talc.

Clause 77. The method of any other clause, wherein the chemical nucleating agent is a blowing agent.

Clause 78. The method of any other clause, wherein the blowing agent is citric acid or a citric acid-based material.

Clause 79. The method of any other clause, wherein the blowing agent is a composition comprising citric acid and a crystal nucleating agent.

Clause 80. The method of any other clause, wherein the core-layer formulation further comprises a slip agent.

Clause 81. The method of any other clause, wherein the slip agent is about 0% to 3% (w/w) of the core-layer formulation.

Clause 82. The multiple layer tube of any other clause, wherein the density of the multiple layer tube is about 0.35 g/cm³ to 0.55 g/cm³.

Clause 83. The multiple layer tube of any other clause, wherein the density of the multiple layer tube is about 0.4 g/cm³.

Clause 84. The multiple layer tube of any other clause, wherein the core layer has a density of about 0.1 g/cm³ to 0.8 g/cm³.

Clause 85. The multiple layer tube of any other clause, wherein the core layer has a density of about 0.3 g/cm³ to 0.5 g/cm³.

Clause 86. The multiple layer tube of any other clause, wherein the core layer has a density of about 0.3 g/cm³ to 0.35 g/cm³.

Clause 87. The multiple layer tube of any other clause, wherein the outer layer has a density of about 0.93 g/cm³.

Clause 88. The multiple layer tube of any other clause, wherein the inner layer has a density of about 0.93 g/cm3.

Example 1

Formulations and Test Results

Inner-layer formulation 28 comprises about 100% FORMOSA PLASTICS® FORMOLENE® HB5502F HDPE hexene copolymer. Outer-layer formulation 32 comprises about 99% FORMOSA PLASTICS® FORMOLENE® HB5502F HDPE hexene copolymer and about 1% COLORTECH® 11933-19.

Core-layer formulation 36 comprises FORMOSA PLASTICS® FORMOLENE® HB5502F HDPE hexene copolymer which was used as polyethylene base resin. The polyethylene base resin was used in various percentages from about 97.95% to about 100% of the formulation. In some examples, the polyethylene base resin was blended with HYDROCEROL® CF 40E as a nucleating agent and Heritage Plastics HT6000 LLDPE talc as another nucleating agent, and N2 as a blowing agent. The blowing agent was used at levels between about 0.05 lbs/hr to about 0.15 lbs/hour. COLORTECH® 11933-19 was added as a colorant in some examples. The various formulations and resulting multiple layer tube densities are shown below in Table 6.

TABLE 6

Comparison of different insulative cellular non-aromatic polymeric material formulations to create various multiple layer parison and insulative container densities

| | Inner-Layer Formulation | Core-Layer Formulation | | | | | Outer-Layer Formulation | | Tube |
|---|---|---|---|---|---|---|---|---|---|
| Trial | Formosa 5502F | Formosa 5502F | Colortech | CF-40E | HT6000 | N2 [lbs/hr] | Formosa 5502F | Colortech | Density [g/cm$^3$] |
| 1 | 100% | 97.95% | 1% | 0.75% | 0.3% | 0.1222 | 99% | 1% | * |
| 2 | 100% | 98% | 0% | 2% | 0% | 0.0529 | 99% | 1% | * |
| 3 | 100% | 99.25% | 0% | 0.75% | 0% | 0.0534 | 99% | 1% | * |
| 4 | 100% | 99% | 0% | 1.0% | 0% | 0.0511 | 99% | 1% | 0.4292 |
| 5 | 100% | 98.7% | 0% | 1.0% | 0.3% | 0.0514 | 99% | 1% | 0.4272 |
| 6 | 100% | 98.45% | 0% | 1.25% | 0.3% | 0.0521 | 99% | 1% | 0.4276 |
| 7 | 100% | 98.75% | 0% | 1.25% | 0% | 0.0529 | 99% | 1% | 0.4236 |
| 8 | 100% | 98.75% | 0% | 1.25% | 0% | 0.0522 | 99% | 1% | 0.4234 |
| 9 | 100% | 98.75% | 0% | 1.25% | 0% | 0.0538 | 99% | 1% | 0.4304 |
| 10 | 0% | 100% | 0% | 0% | 0% | 0.1468 | 0% | 0% | * |
| 11 | 100% | 100% | 0% | 0% | 0% | 0.1392 | 99% | 1% | * |
| 12 | 100% | 99.9% | 0% | 0% | 0.1% | 0.1393 | 99% | 1% | * |
| 13 | 100% | 99.5% | 0% | 0% | 0.5% | 0.0656 | 99% | 1% | * |
| 14 | 100% | 99.4% | 0% | 0.1% | 0.5% | 0.0702 | 99% | 1% | * |
| 15 | 100% | 99.3% | 0% | 0.2% | 0.5% | 0.0692 | 99% | 1% | * |
| 16 | 100% | 99.7% | 0% | 0.1% | 0.2% | 0.0673 | 99% | 1% | * |
| 17 | 100% | 99.7% | 0% | 0.1% | 0.2% | 0.0892 | 99% | 1% | * |
| 18 | 100% | 99.7% | 0% | 0.1% | 0.2% | 0.105 | 99% | 1% | * |
| 19 | 100% | 99.7% | 0% | 0.1% | 0.2% | 0.1188 | 99% | 1% | * |
| 20 | 100% | 99.7% | 0% | 0.1% | 0.2% | 0.0915 | 99% | 1% | * |
| 21 | 100% | 99.05% | 0% | 0.75% | 0.2% | 0.0906 | 99% | 1% | * |

* Data not available

Example 2

Density Measurements

This Example demonstrates the test used to measure the density of filled and unfilled polymer parts.

Procedure

The density was determined by the apparatus shown, unassembled, in FIG. 5. Although not shown in FIG. 5, the apparatus also included a thermometer to measure the suspension liquid temperature. A suspension liquid is a fluid with a density lower than that of the sample to be measured. The sample must sink in the suspension fluid to determine the sample density. Water has a density of 1 g/cm3, so most unfilled polymers require some other suspension fluid such as isopropyl alcohol, density=0.8808 g/cm3. A Mettler AT400 balance (Mettler-Toledo LLC, Columbus, Ohio) was also used.

The density of a limestone-filled HDPE bottle was measured. After taring the balance to zero, the dry solid sample was weighed after placing it in the cup of the Mettler balance. The dry weight was 0.3833 g. After weighing the dry sample and before removing the sample from the cup, the balance was tared again. The sample was removed from the cup and placed on the gem holder in the suspension fluid. The sample was weighed providing the weight with a negative number (−0.3287 g). The number was converted to its absolute value (0.3287 g); the positive value is the sample buoyancy. The sample density was calculated by multiplying the dry weight (0.3833 g) by the sample buoyancy (0.3287 g) by the suspension fluid density (0.8808 g/cc), which equaled 1.0272 g/cc.

Example 3

Formulations

Core-layer formulation 36 comprised FORMOSA PLASTICS® FORMOLENE® HB5502F HDPE hexene copolymer which was used as polyethylene base resin. In some examples, core-formulation 36 comprised Versalite (A) or Versalite (B). Reference is hereby made to U.S. patent application Ser. No. 14/462,073, filed Aug. 18, 2014 and titled POLYMERIC MATERIAL FOR AN INSULATED CONTAINER for disclosure relating to various formulations of VERSALITE in accordance with the present disclosure, which application is hereby incorporated herein by reference in its entirety. In further examples, LLDPE comprised DOW® DOWLEX™ 2045G LLDPE (available from The Dow Chemical Company), electron beam modified to have long-chain branching and a melt index of about 0.2 or 0.13 g/10 min. In still further examples, the polyethylene base resin was blended with HYDROCEROL® CF 40E as a chemical blowing agent and Heritage Plastics HT6000 LLDPE talc as another nucleating agent. In still yet further examples, $N_2$ was used as a blowing agent. The blowing agent was used at levels between about 0.02 lbs/hr to about 0.15 lbs/hour. A rotary extrusion blow-molding machine (available from Wilmington Machinery of Wilmington, N.C.) was used in accordance with the present disclosure. The RPM speed of this machine was at levels between about 5 RPM to about 75 RPM. The various formulations are shown below in Table 10.

The blowing agent, $N_2$, was injected into molten core-formulation 36 to expand the molten formulation and reduce the density of the mixture of polymer and nucleating agent. The resulting expanded formulation was then extruded through a die head to establish a core-layer parison and to form a tube. The tube was molded to form a container according to the present disclosure.

The formulations of different insulative cellular non-aromatic polymeric material formulations in this Example are shown in Table 7.

TABLE 7

Comparison of different insulative cellular non-aromatic polymeric material formulations of Example 3.

| Trial [#] | Formosa 5502F | Ampacet 102823 [0.2MI] | Ampacet 102823 [0.13MI] | Versalite | CF-40E | HT6000 | N₂ [lbs/hr] | Processing [RPM] |
|---|---|---|---|---|---|---|---|---|
| 7.0.0 | 100% | 0% | 0% | 0% | 0% | 0% | 0 | 20 |
| 7.0.5 | 100% | 0% | 0% | 0% | 0% | 0% | 0.132 | 20 |
| 7.1.0 | 98.8% | 0% | 0% | 0% | 0.2% | 1.0% | 0.132 | 20 |
| 7.2.0 | 49.7% | 49.7% | 0% | 0% | 0.1% | 0.5% | 0.132 | 20 |
| 7.3.0 | 0% | 0% | 0% | 100% (B) | 0% | 0% | 0.132 | 12 |
| 7.3.1 | 0% | 0% | 0% | 100% (B) | 0% | 0% | 0.132 | 24 |
| 7.4.0 | 0% | 0% | 0% | 100% (A) | 0% | 0% | 0.132 | 12 |
| 7.4.1 | 0% | 0% | 0% | 100% (A) | 0% | 0% | 0.132 | 24 |
| 7.4.2 | 0% | 0% | 0% | 100% (A) | 0% | 0% | 0.132 | 36 |
| 7.4.3 | 0% | 99.4% | 0% | 0% | 0.1% | 0.5% | 0.132 | 18 |
| 7.4.4 | 0% | 99.4% | 0% | 0% | 0.1% | 0.5% | 0.132 | 36 |
| 7.5.0 | 0% | 99.4% | 0% | 0% | 0.1% | 0.5% | 0.132 | 20 |
| 7.5.1 | 0% | 99.4% | 0% | 0% | 0.1% | 0.5% | 0.132 | 75 |
| 7.6.0 | 0% | 74.55% | 0% | 24.85% | 0.1% | 0.5% | 0.132 | 20 |
| 7.7.0 | 0% | 0% | 99.4% | 0% | 0.1% | 0.5% | 0.07 | 20 |
| 7.7.1 | 0% | 0% | 99.4% | 0% | 0.1% | 0.5% | 0.07 | 20 |
| Pre-7.8.0 Purge | 100% | 0% | 0% | 0% | 0% | | 0.07 | 20 |
| 7.8.0 | 99.4% | 0% | 0% | 0% | 0.1% | 0.5% | 0.07 | 11 |
| 7.8.1 | 99.4% | 0% | 0% | 0% | 0.1% | 0.5% | 0.035 | 11 |
| 7.9.0A | 99.4% | 0% | 0% | 0% | 0.1% | 0.5% | 0.035 | 11 |
| 7.9.0B | 99.4% | 0% | 0% | 0% | 0.1% | 0.5% | 0.035 | 19 |
| 7.9.1 | 99.4% | 0% | 0% | 0% | 0.1% | 0.5% | 0.07 | 18 |
| 7.9.2A | 99.4% | 0% | 0% | 0% | 0.1% | 0.5% | 0.05 | 18 |
| 7.9.2B | 99.4% | 0% | 0% | 0% | 0.1% | 0.5% | 0.05 | 11 |
| 7.10A | 0% | 0% | 99.4% | 0% | 0.1% | 0.5% | 0.02 | 9 |
| 7.10B | 0% | 0% | 99.4% | 0% | 0.1% | 0.5% | 0.02 | 25 |
| 7.10C | 0% | 0% | 99.4% | 0% | 0.1% | 0.5% | 0.05 | 25 |
| 7.11A | 84.5% | 0% | 14.9% | 0% | 0.1% | 0.5% | 0.03 | 18 |
| 7.9 | 99% | 0% | 0% | 0% | 1% | 0% | 0.05 | * |
| 7.10 | 98.7% | 0% | 0% | 0% | 1% | 0.3% | 0.05 | * |
| 7.11 | 98.45% | 0% | 0% | 0% | 1.25% | 0.3% | 0.05 | * |
| 7.12 | 98.75% | 0% | 0% | 0% | 1.25% | 0% | 0.05 | * |
| 7.20 | 99.4% | 0% | 0% | 0% | 0.10% | 0.5% | 0.07 | * |
| 7.21 | 99.3% | 0% | 0% | 0% | 0.20% | 0.5% | 0.07 | * |

* Data not available

Example 4

Parison Densities, Bottle Densities, Weight, Top Load Performance, and Thickness for Formulations of Example 3

Containers formed according to Table 7 were subjected to a series of measurements and performance tests including core-layer parison density (p) measurements, container density (p) measurements, weight measurements, thickness measurements, and top load force performance measurements. The results are shown below in Table 8.

Density was determined by the apparatus and methods described in Example 2. Top load performance was measured by methods described in Example 5.

TABLE 8

Parison densities, container densities, weights, top load performance, and bottle sidewall thicknesses of different insulative cellular non-aromatic polymeric material formulations of Example 3.

| Trial [#] | Parison Density [g/cc] | Container Density [g/cc] | Weight [g] | Top Load [lbs-F] | Thickness [mils] |
|---|---|---|---|---|---|
| 7.0.0 | 0.95 | 0.95 | 60.3 | 133 | 42.3 |
| 7.0.5 | 0.90 | * | * | * | * |
| 7.1.0 | 0.70 | * | * | * | * |
| 7.2.0 | 0.60 | * | * | * | * |
| 7.3.0 | 0.70 | * | * | * | * |
| 7.3.1 | 0.58 | * | * | * | * |
| 7.4.0 | 0.56 | * | * | * | * |
| 7.4.1 | 0.57 | * | * | * | * |
| 7.4.2 | 0.57 | * | * | * | * |
| 7.4.3 | 0.47 | * | * | * | * |
| 7.4.4 | 0.42 | * | * | * | * |
| 7.5.0 | 0.43 | * | * | * | * |
| 7.5.1 | 0.51 | * | * | * | * |
| 7.6.0 | 0.55 | 0.58 | * | * | * |
| 7.7.0 | 0.40 | * | * | * | * |
| 7.7.1 | 0.41 | 0.64 | * | * | * |
| Pre-7.8.0 Purge | * | 0.62 | * | * | * |
| 7.8.0 | 0.42 | * | * | * | * |

TABLE 8-continued

Parison densities, container densities, weights, top load performance, and bottle sidewall thicknesses of different insulative cellular non-aromatic polymeric material formulations of Example 3.

| Trial [#] | Parison Density [g/cc] | Container Density [g/cc] | Weight [g] | Top Load [lbs-F] | Thickness [mils] |
|---|---|---|---|---|---|
| 7.8.1 | 0.42 | * | * | * | * |
| 7.9.0A | 0.41 | 0.62 | 30.7 | 31 | 38.1 |
| 7.9.0B | 0.51 | 0.73 | 49.0 | 87 | 43.1 |
| 7.9.1 | * | * | * | * | * |
| 7.9.2A | 0.43 | 0.68 | 41.9 | 56 | 40.4 |
| 7.9.2B | * | * | * | * | * |
| 7.10A | 0.48 | 0.51 | * | * | * |
| 7.10B | 0.61 | 0.81 | * | * | * |
| 7.10C | 0.66 | * | * | * | * |
| 7.11A | 0.52 | 0.72 | * | * | * |
| 7.9 | 0.43 | 0.74 | 56 | * | * |
| 7.10 | 0.43 | 0.73 | 56 | * | * |
| 7.11 | 0.43 | 0.73 | 56 | * | * |
| 7.12 | 0.42 | 0.73 | 56 | * | * |
| 7.20 | * | 0.683 | 56 | * | * |
| 7.21 | * | 0.701 | 56 | * | * |

*Data not available

Example 5

Top Load Measurements
General Procedure

Top load testing determines how much force a container can withstand before the container fails or necks in to form an hourglass shape. Various containers were subjected to top load testing. An Instron tester, such as and generally consistent with an Instron Series 5500 Load Frame, may be used to determine top load performance.

The top load test was generally performed according to the following procedure. A container was placed on a flat surface such that the floor of the container was arranged to lie in a substantially parallel relation to the flat surface. A crosshead of the Instrom tester applied a compressive force to the top of the neck of the container. A load transducer, mounted in series with the container, measured the applied load. Containers were tested until they failed or necked in to form an hourglass shape. Once failure or necking was observed, the value shown on Instron tester was recorded.

The invention claimed is:

1. A method of producing a multiple layer tube, the method comprising the steps of
extruding an inner-layer formulation to form an inner parison,
extruding a core-layer formulation to form a core parison,
extruding an outer-layer formulation to form an outer parison,
aligning the inner parison, the core parison, and the outer parison to cause the core parison to be located between the inner parison and the outer parison to cause the core parison to surround the inner parison and to be surrounded by the outer parison to form an extruded multiple layer tube,
wherein the multiple layer tube has a density of about 0.3 g/cm$^3$ to 0.8 g/cm$^3$,
wherein the core-layer formulation comprises one or more high density polyethylene base resins (HDPE), and
wherein the core-layer formulation comprises a chemical nucleating agent, a physical nucleating agent, and a physical blowing agent.

2. The method of claim 1, wherein the multiple layer tube has a density of about 0.4 g/cm$^3$ and the core parison has a density less than a density of the inner parison.

3. The method of claim 1, wherein the core parison has a density of about 0.1 g/cm$^3$ to 0.8 g/cm$^3$.

4. The method of claim 3, wherein the core parison has a density of about 0.3 g/cm$^3$ to 0.35 g/cm$^3$.

5. The method of claim 4, wherein the core parison has a density of about 0.32 g/cm$^3$.

6. The method of claim 5, wherein the core parison has a density less than a density of the outer parison.

7. The method of claim 6, wherein the density of the inner parison is about equal to the density of the outer parison.

8. The method of claim 1, wherein the multiple layer tube has a density of about 0.4 g/cm$^3$ and the core parison has a density less than a density of the outer parison.

9. The method of claim 1, wherein the inner-layer formulation is different from the outer-layer formulation.

10. The method of claim 1, wherein the inner-layer formulation is the same as the outer-layer formulation.

11. The method of claim 1, wherein the core-layer formulation comprises an insulative cellular non-aromatic polymeric material.

12. The method of claim 11, wherein the core-layer formulation comprises one or more high density polyethylene base resins (HDPE).

13. The method of claim 12, wherein the HDPE is unimodal.

14. The method of claim 13, wherein the unimodal HDPE is a unimodal, high-melt strength HDPE.

15. The method of claim 14, wherein the unimodal, high-melt strength HDPE is electron beam modified.

16. The method of claim 15, wherein the electron beam modified unimodal, high-melt strength HDPE has long chain branching and a melt index of about 0.25 g/10 min.

17. The method of claim 16, wherein the core-layer formulation lacks talc.

18. The method of claim 17, wherein the core-layer formulation further comprises a slip agent.

19. A method of producing a multiple layer tube, the method comprising the steps of
extruding an inner-layer formulation to form an inner parison,
extruding a core-layer formulation to form a core parison,
aligning the inner parison and the core parison to cause the core parison the core parison to surround the inner parison and form an extruded multiple layer tube,
wherein the multiple layer tube has a density of about 0.3 g/cm$^3$ to 0.8 g/cm$^3$,
wherein the core-layer formulation comprises one or more high density polyethylene base resins (HDPE), and
wherein the core-layer formulation comprises a chemical nucleating agent, a physical nucleating agent, and a physical blowing agent.

20. A method of producing a multiple layer tube, the method comprising the steps of
extruding a core-layer formulation to form a core parison,
extruding an outer-layer formulation to form an outer parison,
aligning the core parison and the outer parison to cause the core parison to be surrounded by the outer parison to form an extruded multiple layer tube,
wherein the multiple layer tube has a density of about 0.3 g/cm$^3$ to 0.8 g/cm$^3$,
wherein the core-layer formulation comprises one or more high density polyethylene base resins (HDPE), and wherein the core-layer formulation comprises a chemical nucleating agent, a physical nucleating agent, and a physical blowing agent.

\* \* \* \* \*